United States Patent [19]
Jondrow et al.

[11] Patent Number: 5,428,355
[45] Date of Patent: Jun. 27, 1995

[54] POSITION ENCODER SYSTEM

[75] Inventors: Timothy J. Jondrow; Robert B. E. Puckette; Michael D. Derocher; Steven L. Fogle, all of Corvallis, Oreg.

[73] Assignee: Hewlett-Packard Corporation, Palo Alto, Calif.

[21] Appl. No.: 856,436

[22] Filed: Mar. 23, 1992

[51] Int. Cl.⁶ ................. H03K 17/94; G06F 3/033; G06K 11/06
[52] U.S. Cl. ........................ 341/20; 341/22; 341/33; 345/157; 345/161; 345/163; 345/168; 364/190; 364/708.1; 364/709.1; 364/709.11; 361/679; 361/680; 361/683
[58] Field of Search ............ 341/20, 22, 26, 33; 340/870.37; 345/157, 158, 160, 161, 163, 168, 169; 364/188–190, 708.1, 709.01, 709.08, 709.09, 709.11, 709.12, 709.13; 200/600; 361/288, 679, 683, 680

[56] References Cited

U.S. PATENT DOCUMENTS

| | | |
|---|---|---|
| 3,068,457 | 12/1962 | Nevius . |
| 3,125,716 | 3/1964 | Machlis . |
| 3,198,937 | 8/1965 | Wooster . |
| 3,222,591 | 12/1965 | Mynall . |
| 3,702,467 | 11/1972 | Melnyk ............ 340/870.37 |
| 3,723,866 | 3/1973 | Michaud et al. ........ 324/662 |
| 3,857,092 | 12/1974 | Meyer ................ 324/662 |
| 3,873,916 | 3/1975 | Sterki ................ 324/725 |
| 3,938,113 | 2/1976 | Dobson et al. ....... 340/870.37 |
| 3,961,318 | 6/1976 | Farrand et al. ........ 324/660 |
| 4,182,981 | 1/1980 | Shum et al. ........... 324/662 |
| 4,217,542 | 8/1980 | Abbe et al. ........... 324/662 |
| 4,404,560 | 9/1983 | Williams, Jr. .......... 324/660 |
| 4,420,754 | 12/1983 | Andermo ............. 324/660 |
| 4,453,316 | 6/1984 | Marveggio ........... 33/199 R |
| 4,459,702 | 7/1984 | Medwin .............. 377/24 |
| 4,581,676 | 4/1986 | Baxter et al. .......... 361/283.4 |
| 4,586,260 | 5/1986 | Baxter et al. .......... 33/706 |
| 4,654,524 | 3/1987 | Kita ................ 250/231.14 |
| 4,654,581 | 3/1987 | Neukermans et al. ...... 324/725 |
| 4,680,577 | 7/1987 | Straayer et al. ........ 345/160 |
| 4,743,838 | 5/1988 | Eckerle .............. 324/660 |
| 4,743,902 | 5/1988 | Andermo ............. 324/660 |
| 4,782,327 | 11/1988 | Kley et al. ............ 341/20 |
| 4,798,004 | 1/1989 | Suzuki ............... 33/793 |
| 4,823,364 | 4/1989 | Herzog ............... 375/36 |
| 4,857,828 | 8/1989 | Celine ................ 340/568 |
| 4,896,554 | 1/1990 | Culver ............. 74/471 X Y |
| 4,920,342 | 4/1990 | Gratke ............... 341/22 |
| 4,935,728 | 6/1990 | Kley ................. 345/161 |
| 4,959,615 | 9/1990 | Andermo .......... 340/870.37 |
| 5,049,863 | 9/1991 | Oka ................. 345/163 |
| 5,126,955 | 6/1992 | Tomoda .............. 361/680 |
| 5,172,485 | 12/1992 | Gerhard et al. ........ 33/706 |
| 5,270,710 | 12/1993 | Gaultier et al. ......... 341/33 |

FOREIGN PATENT DOCUMENTS

| | | |
|---|---|---|
| 0404975A1 | 1/1991 | European Pat. Off. . |
| 0404980A1 | 6/1991 | European Pat. Off. . |
| 0435429A1 | 7/1991 | European Pat. Off. . |
| 2017188 | 8/1971 | Germany . |
| 2150928 | 5/1972 | Germany . |
| 2217183 | 12/1972 | Germany . |
| 2246660 | 5/1973 | Germany . |
| 2254567 | 5/1973 | Germany . |
| 2218824 | 10/1973 | Germany . |
| 2853142 | 5/1988 | Germany . |
| 59-214712A | 4/1984 | Japan . |
| 1523943 | 9/1978 | United Kingdom . |
| 2118720A | 11/1983 | United Kingdom . |
| 2139359A | 11/1984 | United Kingdom . |
| 2266360A | 10/1993 | United Kingdom . |

OTHER PUBLICATIONS

Electronics Week, Jul. 23, 1984, p. 26, 'Puck Pointer' Combines Functions of Mouse and Joystick in Number-Pad Sized Package.

(List continued on next page.)

*Primary Examiner*—Jeffrey A. Hofsass
*Assistant Examiner*—Andrew Hill

[57] ABSTRACT

The position encoder system requires no keyboard surface area and includes a retractable and extendable handle that is stored inside the computer when not in use. The handle is extended for use near the computer keyboard. The movement of the handle is sensed by a high resolution sensing system that consumes relatively little power.

36 Claims, 11 Drawing Sheets

OTHER PUBLICATIONS

PC Magazine, Aug. 1987, pp. 95–96, 99–101, 105–106, 117–120, 159–161, 183–185, 199–200.

"Lightgate Input Device Offers More Intuitive, Precise Interface" Info–World, Dec. 14, 1987, 2 pages.

1–Page article entitled "A Different Kind of Animal", ALTRA, circa Jan. 1992.

2–Page brochure entitled "Push–n–Point" Home Row, Inc.; Apr., 1991.

"The Mouse Ran Under The 'J'", Electronic Engineering Times; Jul. 2, 1990.

"Thumb–actuated, Cursor–positioning Devices Provides 2–D Axis Control in a Small Space" ALPS Electric U.S.A., Product Update, EDN, Feb., 1989.

News Release by ALPS Electric (USA), Inc. entitled "ALPS Electric Introduces New Cursor Control Device for Laptops," released Nov. 14, 1988–2 pages.

Mitutoyo "Digimatic Caliper" instruction sheet; Series 500, 550, 551; Manual No. 2035, circa Jan. 1992.

Service Manual, HP9111A Graphics Tablet, Section VI, 27 pages, Hewlett Packard Co., circa Jan. 1992.

"Development of A Capacitive Measuring System for Workshop Measuring Instruments"; Fred V. Fowler Co. Inc., Oct. 1985, 8 pages.

"Field Mice, DIfferent, Yes. Better, Maybe"; PC Magazine, Oct. 15, 1991; pp. 111–133.

"Isn't It Time We Get Serious About Laptop Pointing Devices?", Article by John Dickinson; Apr, 1991, p. 46.

"Input Alternatives–How and Why to Choose a Better Pointing Device" by Franklin N. Tessler; Macworld, Jun. 1992;–pp. 154–159.

"Display–Selection Techniques for Text Manipulation" by William K. English, Douglas C. Engelbart & Melvyn L. Berman; IEEE Transactions on Human Factors in Electronics; Mar. 1967.

"Fingertip Mouse Control Without Leaving Your Keyboard"; May 1991; PC World, p. 103.

"Fresh Ways to Talk to Your Computer", Design News, Feb. 25, 1991, pp. 83–86.

"Touchman–The World's First Stationary Mouse" Agiler, 5–page brochure; Sep. 14, 1990.

"Notebooks Need Portable Pointer—Increasing Importance of Graphical Interface Urges Portables to Comply"; Infoworld; Jun. 17, 1991, p. 21.

"The Twiddler" Handykey Corporation brochure, copyright Jan. 1991.

Pointing Device Specification Sheets, 3 pages–Jun. 3, 1991,

Two page specification sheet, Fujitsu Ltd., Pivoting Dome Pointing device Jul. 16, 1991.

Micro Track Ball; ALPS Electric Co. Ltd.; 1 page specification, circa Jan. 1992.

Flyer, "*Das Sylvac—Mess-System,*" 4 pages, circa 1972, Germany.

Report of Commissariat à l'Energie Atomique, "*Capteurs Capacitifs de Deplacements, Lineaires et Augulaires,*" France, 1975, 10 pp.

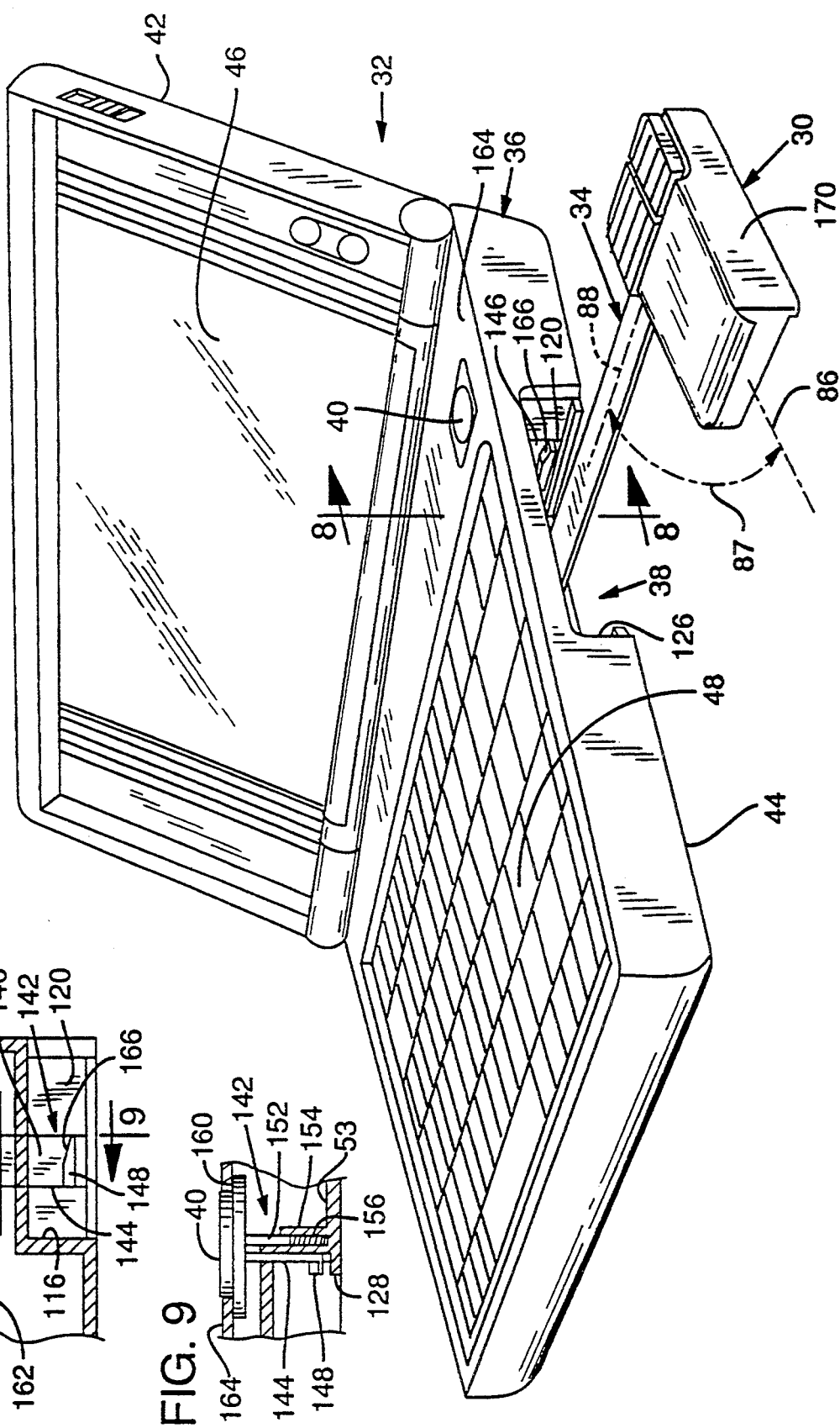

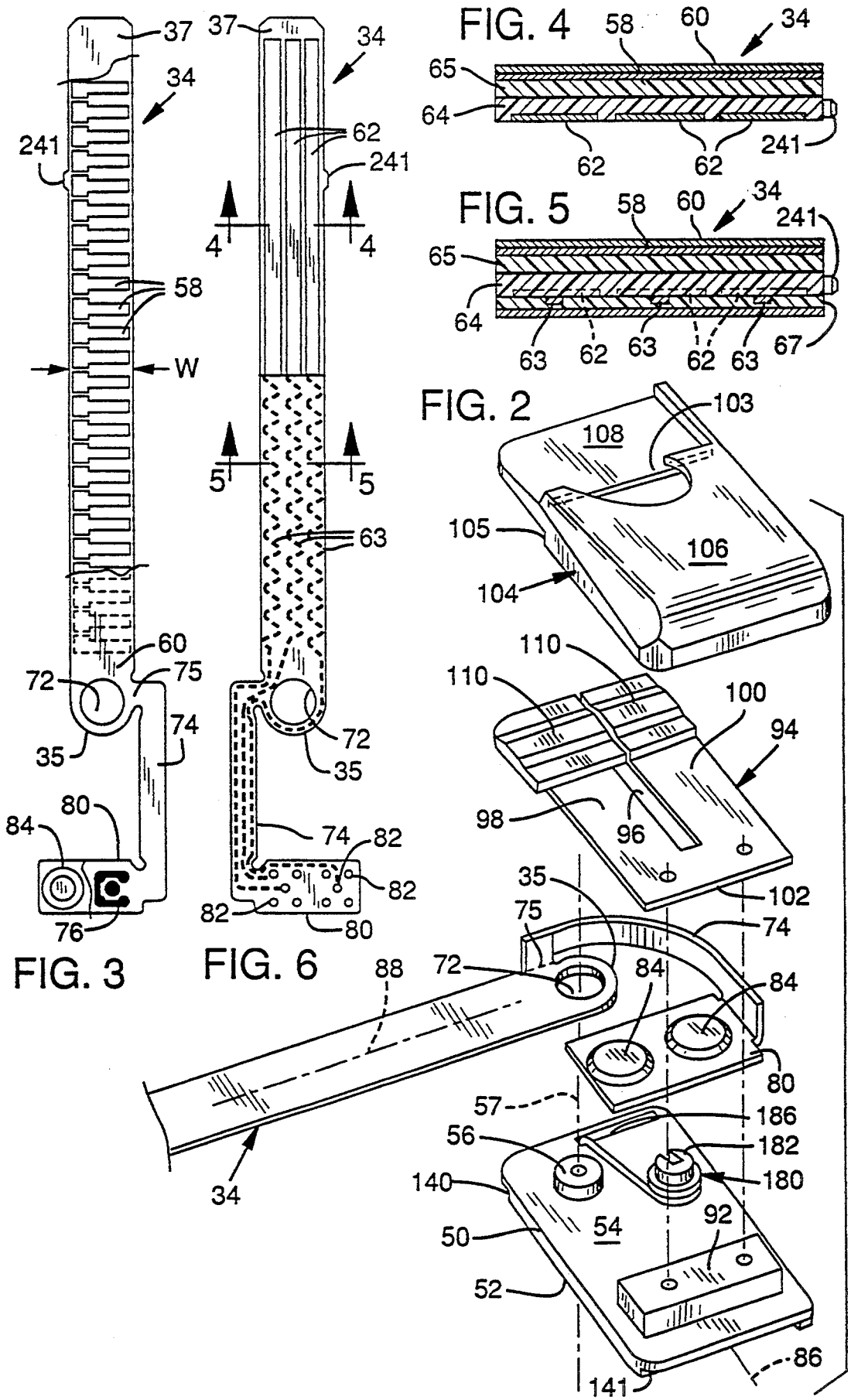

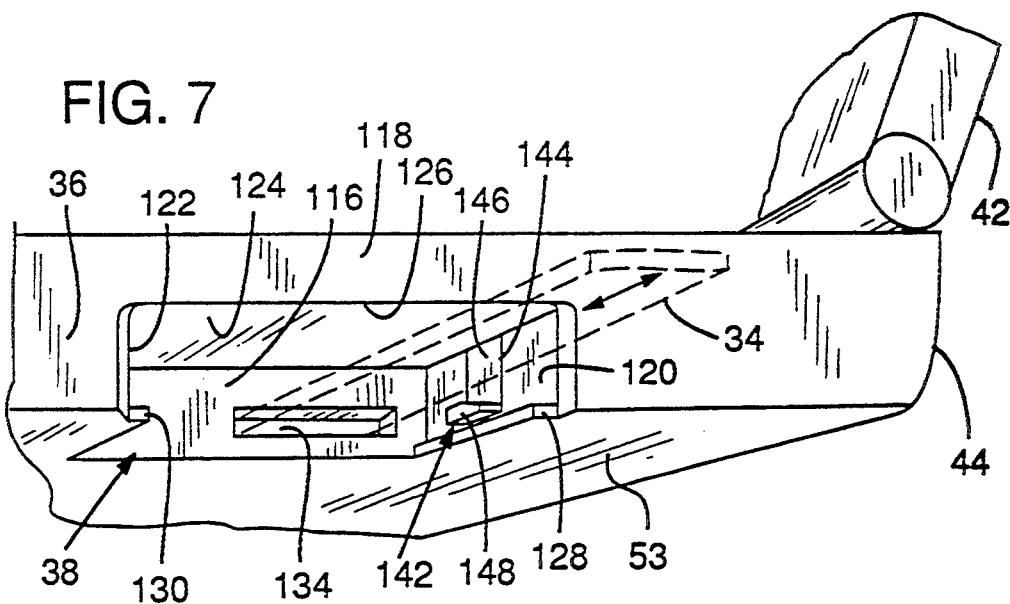
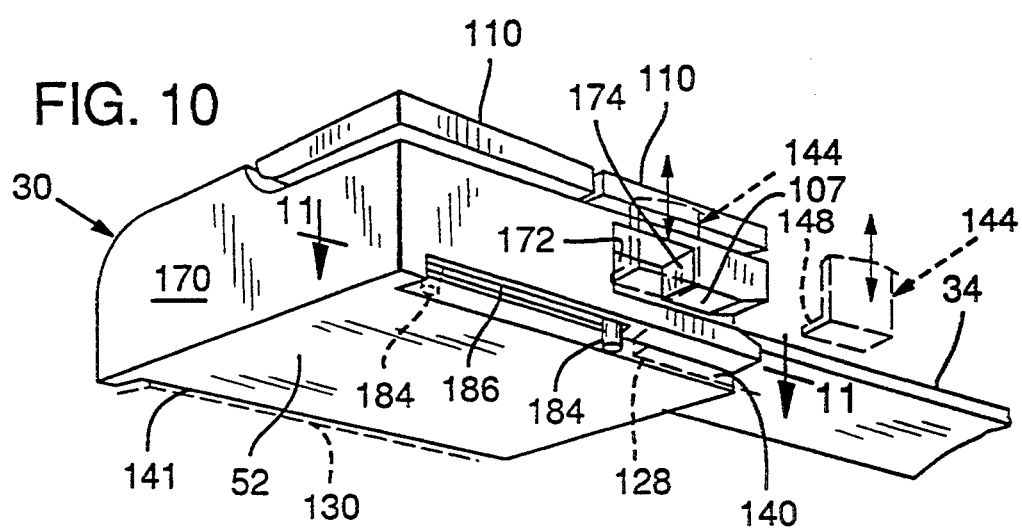
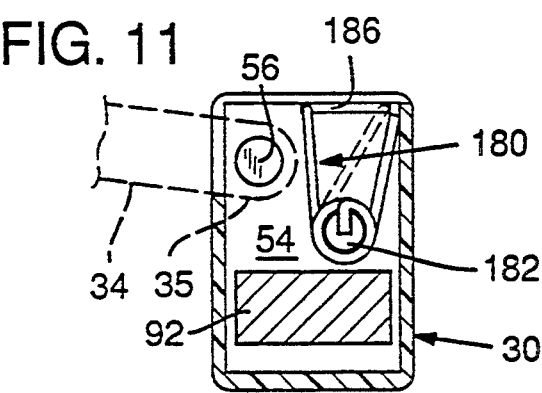

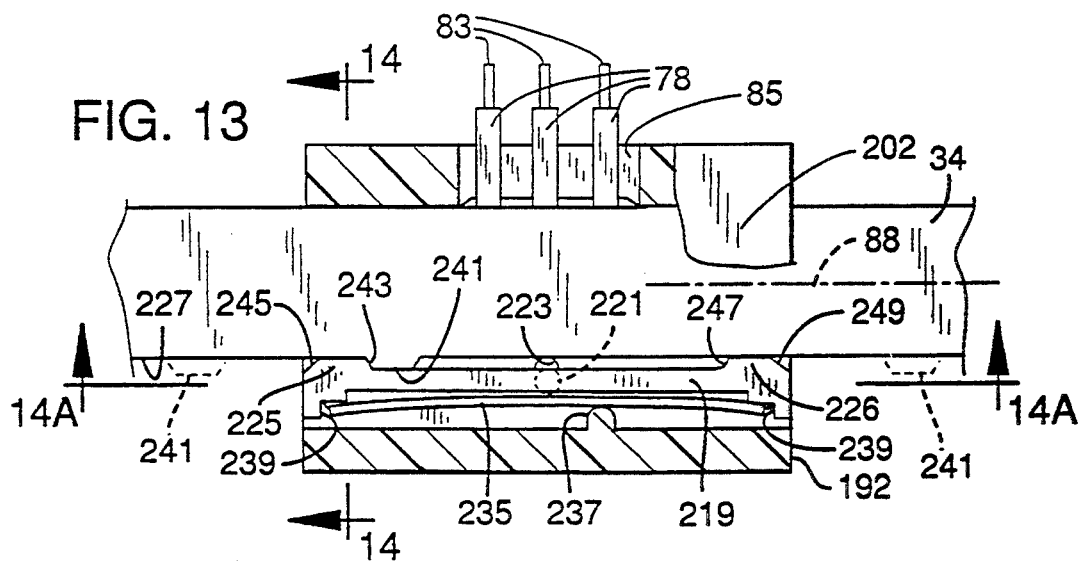
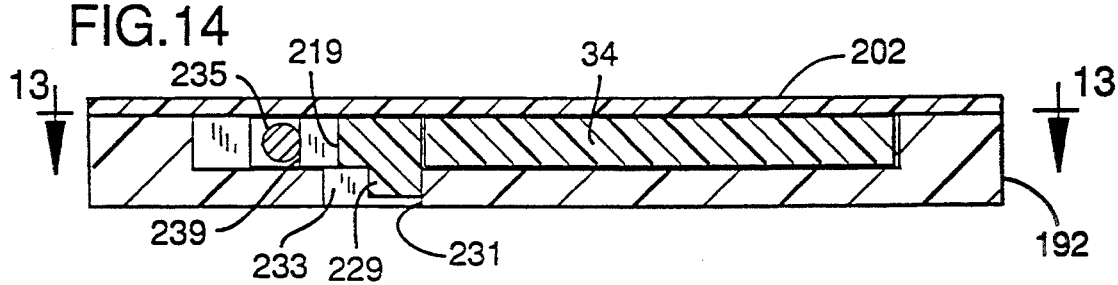
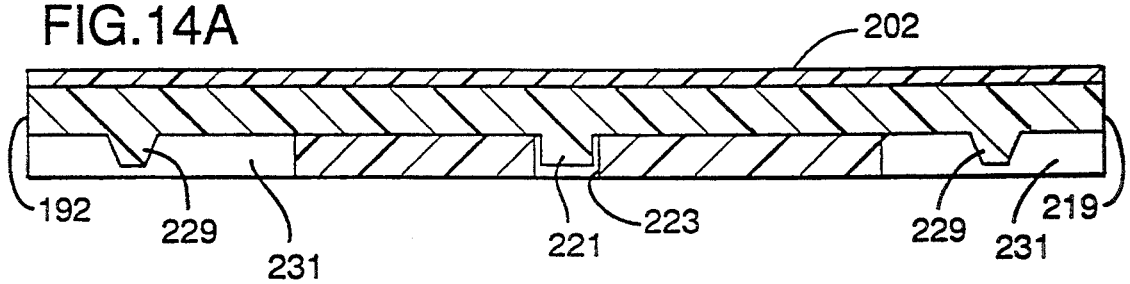

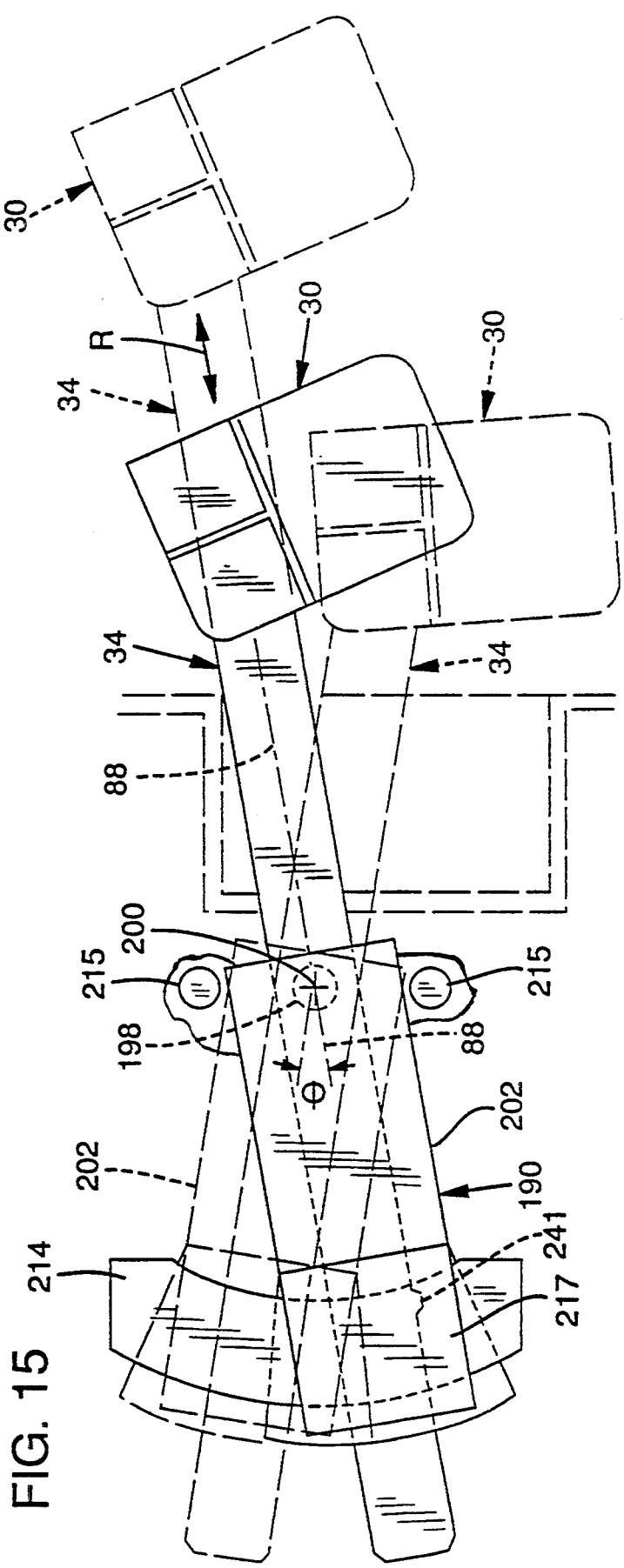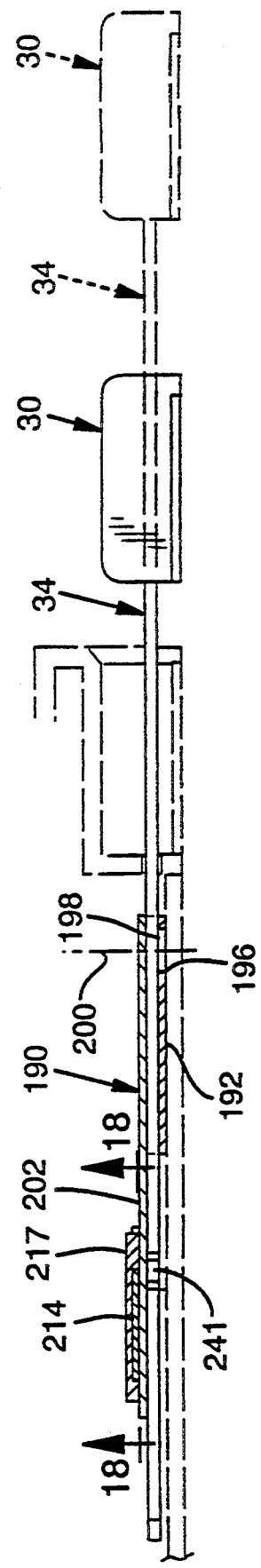

FIG. 23

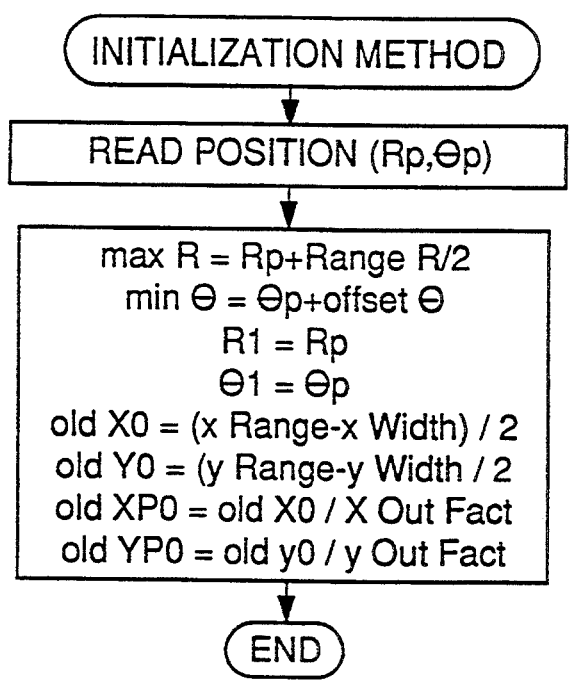

INITIALIZATION METHOD
↓
READ POSITION (Rp, Θp)
↓
max R = Rp+Range R/2
min Θ = Θp+offset Θ
R1 = Rp
Θ1 = Θp
old X0 = (x Range-x Width) / 2
old Y0 = (y Range-y Width / 2
old XP0 = old X0 / X Out Fact
old YP0 = old y0 / y Out Fact
↓
END

FIG. 25

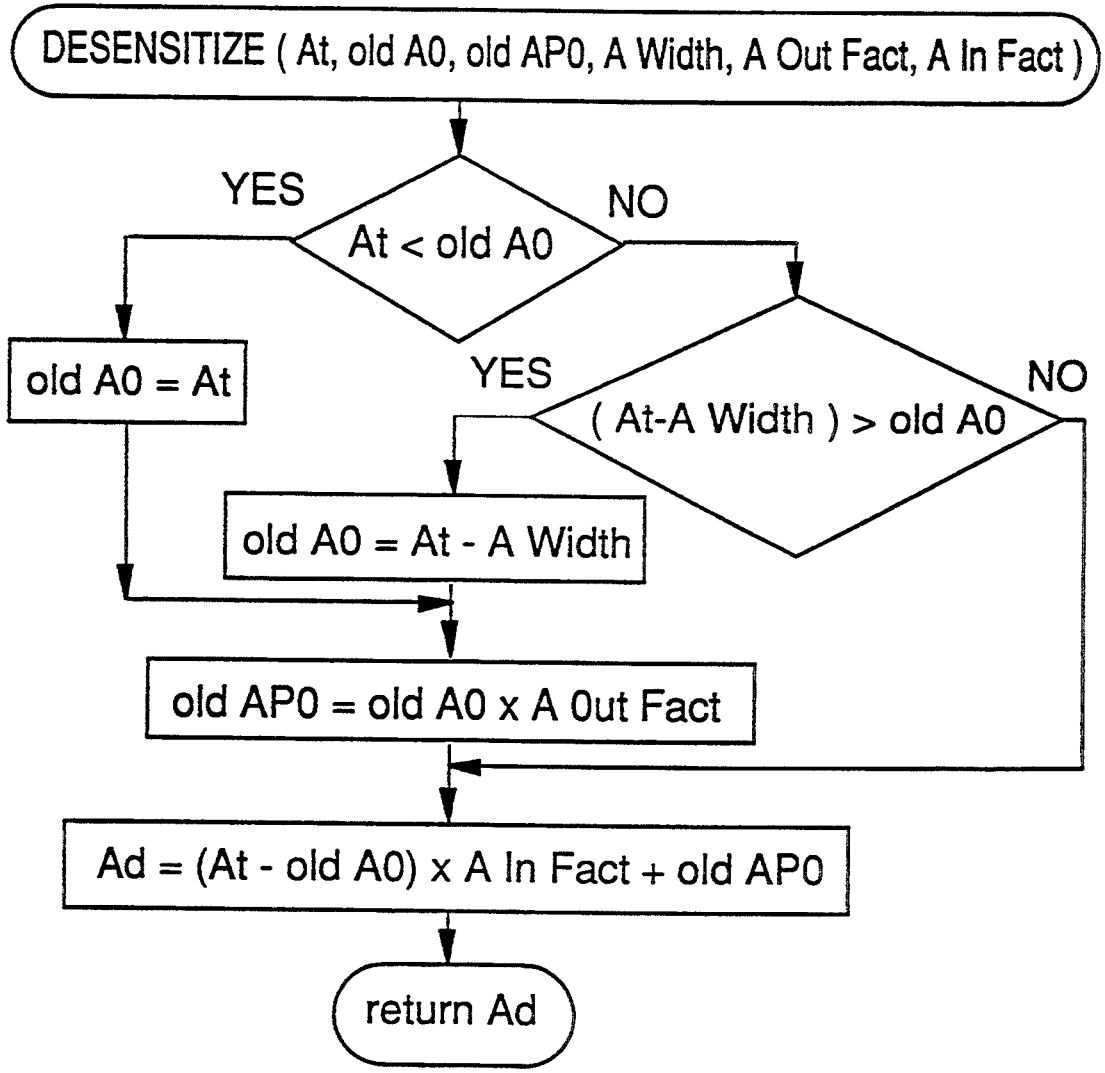

DESENSITIZE ( At, old A0, old AP0, A Width, A Out Fact, A In Fact )
↓
At < old A0 ?
 YES → old A0 = At
 NO → (At-A Width) > old A0 ?
  YES → old A0 = At - A Width
  NO →
↓
old AP0 = old A0 × A Out Fact
↓
Ad = (At - old A0) × A In Fact + old AP0
↓
return Ad

POSITION ENCODER SYSTEM

TECHNICAL FIELD

The present invention is directed to a position encoder system that is used as an input device for a computer.

BACKGROUND INFORMATION

Computer keyboards are often supplemented with other types of input devices. Some of these supplemental input devices, such as trackballs or mice, include components that are moved by the user. Encoder mechanisms detect motion of the movable components and provide to the computer digital information representative of movement of the trackball or mouse. This information is typically used by the computer for controlling the movement of a cursor or pointer on a computer display screen.

A mouse is connected to a computer by a flexible cable. The mouse houses a ball that is rolled along a surface adjacent to the computer. Use of a mouse with portable, compact, "notebook" type computers is inconvenient because the mouse must be transported as a separate component. The user must attach the mouse each time the computer is used and detach it when finished.

Some input devices, such as trackballs, may be built into portable computers. Built-in devices have been mounted in the vicinity of the computer keyboard, with the movable component projecting from the upper surface of the keyboard. Devices so mounted to the keyboard necessarily require keyboard surface space, a requirement that is generally contrary to design goals that seek to minimize the keyboard size to make the computer as compact as possible.

Irrespective of whether a conventional mouse or built-in input device is employed, it is desirable to minimize the power consumption of such devices so that the battery life of a portable computer can be maximized.

SUMMARY OF THE INVENTION

The present invention is directed to a position encoder system that requires no keyboard surface area. The system includes a handle that is stored inside the computer when not in use and extended next to the computer for use as an input device. The movement of the handle is sensed by a high resolution sensing system that consumes relatively little power.

BRIEF DESCRIPTION OF THE DRAWINGS

FIG. 1 is a perspective view of a compact notebook-type computer, including the position encoder system of the present invention.

FIG. 2 is a perspective exploded view of the handle part of the present system.

FIG. 3 is a top view of a link for connecting the handle and computer, illustrating the link prior to assembly.

FIG. 4 is a section view of the link taken along line 4—4 of FIG. 3.

FIG. 5 is a section view of the link taken along line 5—5 in FIG. 3.

FIG. 6 is a bottom view of the link.

FIG. 7 is a perspective view showing the stowage compartment in which the handle is stored.

FIG. 8 is a section view taken along line 8—8 of FIG. 1.

FIG. 9 is a section view taken along line 9—9 of FIG. 8.

FIG. 10 is a perspective view of the handle, illustrating mechanisms for latching the handle inside the stowage compartment.

FIG. 11 is a section view taken along line 11—11 of FIG. 10, showing a mechanism for ejecting the handle from the stowage compartment.

FIG. 13 is a top view, in partial section, of the link residing in a carrier component of the sensing components.

FIG. 14 is an enlarged section view, taken along line 14—14 of FIG. 13.

FIG. 14A is an enlarged section view, taken along lines 14A—14A of FIG. 13.

FIG. 15 is a top view of the handle and sensing components of the present invention.

FIG. 16 is a side view, partly in section, of the handle and sensing components.

FIG. 23 is a flow chart of an initialization method of a software driver for the sensing system.

FIG. 25 is a flow chart of a desensitize method of the software driver.

DESCRIPTION OF A PREFERRED EMBODIMENT

Figure 12:
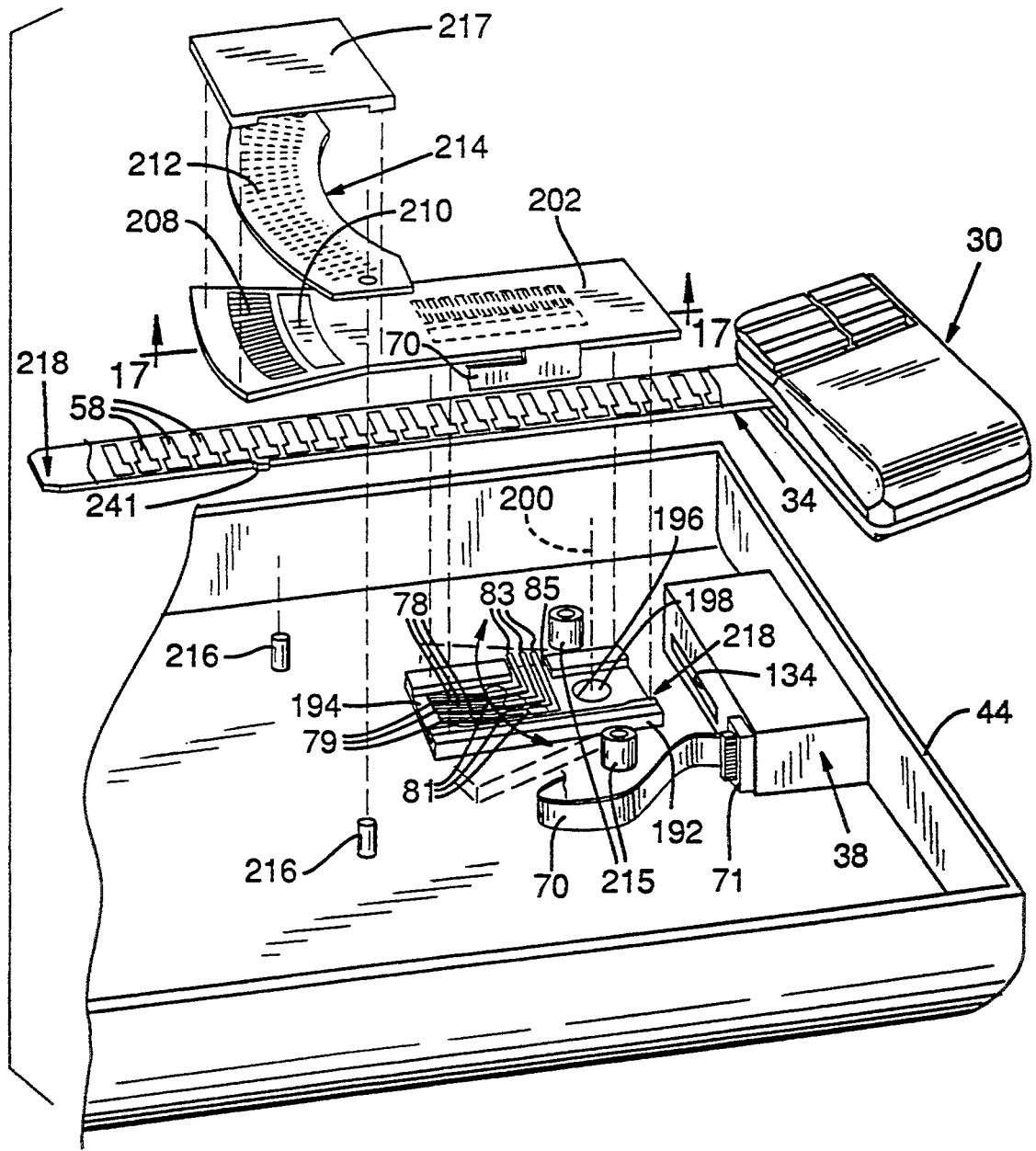
FIG. 12 is a perspective exploded view of the sensing components of the present system.

FIG. 1 shows a preferred embodiment of a position encoder system used as an input device for a portable computer. The system includes a movable handle 30 that is connected to a computer 32 by a link 34. FIG. 1 shows the handle 30 in an extended position. The computer housing 36 includes a stowage compartment 38 into which the handle 30 may be inserted and stowed when not in use. Whenever an eject button 40 is depressed by the user, the handle 30 is ejected from the stowage compartment 38 for manipulation by the user.

Movement of the handle 30 is sensed by a sensing system, which encodes the motion of the handle 30 and provides to the computer 32 digital information representative of the position of the handle. This information is made available to the computer for conventional applications, such as controlling the movement of a cursor or pointer on the computer display screen.

Turning first to the particulars of the handle mechanisms associated with the position encoder system, and with reference to FIGS. 1-6, the computer 32 may be any one of a variety of types, such as the notebook-type shown in FIG. 1. The computer 32 is compact and portable, and can be powered by battery. The housing 36 of the computer is characterized by a top 42 that is hinged to a base 44. The top 42 includes a display screen 46. The base 44 has mounted to it a keyboard 48 that serves as the primary input device for the computer. The microprocessor and memory components required for the computer 32 are housed in the base 44.

The link 34 is connected to move with the handle 30. The present system determines motion of the handle 30 by sensing the corresponding motion of the link 34 as the link moves relative to sensing components that are contained within the base 44 as described below.

As best shown in FIG. 2, the handle includes a substantially flat, plastic bottom 50 that is generally rectangular as viewed from above. The handle 30 is sized so that the undersurface 52 of the bottom 50 is generally coplanar with the bottom surface 53 (see FIGS. 7 and 10) of the computer base 44. The undersurface 52 of the handle bottom 50 comprises, or has attached to it, low-friction material, such as that manufactured under the trademark TEFLON, by DuPont, to permit the extended handle 30 to easily slide over the top of a work surface that supports the computer 32.

The upper surface 54 of the handle bottom 50 includes an upwardly protruding pivot post 56 to which the outer end 35 of the link 34 is pivotally attached. The handle 30, therefore, is pivotable about the post central axis 57.

The link 34 (see FIGS. 3–6) generally comprises an elongated member formed of an injection-molded acetal core 64 having about 0.56 mm thickness. Adhered to the upper surface of the core 64 is a 0.051 mm thick polyester film 65, such as that manufactured under the trademark Mylar, by DuPont, that carries on its upper surface an electrically conductive, patterned layer, hereafter referred to as the R mixer pattern 58. The R mixer pattern 58 is located just beneath a thin, opaque plastic top layer 60 that is adhered to the film 65.

In a preferred embodiment, the film 65 and R mixer pattern 58 have a combined thickness of about 53 $\mu$m, and the plastic top layer 60 is about 38 $\mu$m thick. The R mixer pattern 58 (FIG. 3) is configured as a plurality of adjacent bars, the shapes of which are described more fully below. The movement of this R mixer pattern 58 (as the user moves the handle 30 and attached link 34) is detected by the sensing system as described below.

Three adjacent, electrically conductive strips 62, such as a graphite filled polymer or other conductive material, are molded into the underside of the core 64. Each strip 62 extends along the length of the link 34 from the inner end 37 of the link to a location near the midpoint of the link. The conductive strips 62 each terminate in connection with a three-conductor pattern 63 of conductive material, such as copper, which pattern is carried on a film 67 that is laminated to the underside of the link 34. Each pattern 63 and connected conductive strip 62 conducts switch status information between switches 84 on the handle 30 and the inner end 37 of the link 34.

With reference to FIG. 12, the three conductive strips 62 slide against the free ends 79 of cantilevered spring contacts 78 that conduct the switch status information to the main printed circuit board of the computer 32, as described more fully below.

In a preferred embodiment, the width "W" (FIG. 3) of the link 34 is generally about 13.1 mm. The overall thickness "T" of the link (FIG. 4) is about 0.75 mm. (It will be appreciated that the sections shown in FIGS. 4 and 5 are greatly out of scale for illustrating the positional relationship of the various link layers described here). The relatively high width-to-thickness ratio provides a link that will bend slightly in a direction normal to its width dimension, but remain relatively inflexible when the link is moved in a direction generally parallel to the width dimension. As a result, the extended link 34 can move upwardly or downwardly (in and out of the plane of FIG. 15) so that such a directed force applied to the link, as may occur when the computer 32 is lifted with the handle extended and unsupported, will not break the link. Further, the link will not bend when moved sideways, parallel to the plane of FIG. 3. It is sideways motion of the link that is sensed.

The outer end 35 of the link 34 includes an aperture 72 through which fits the handle pivot post 56 mentioned above (FIG. 2). The outer end 35 of the link also includes a generally elongated extension piece 74. That piece 74 comprises an extension of the pattern 63 and film 67 adhered to a corresponding extension of the link core 64. The link extension piece 74 terminates in a generally rectangular switch piece 80. The upper surface of the switch piece 80 (FIG. 3) includes exposed contact patterns 76 on which are mounted normally-open snap-dome type switches 84. Conductors 82 extend between those patterns 76 and the three-conductor pattern 63 on the underside of the switch piece 80 (FIG. 6). Normally-open snap-dome type switches 84 are mounted to the contacts 82 on the upper surface of the switch piece 80. In a preferred embodiment, two such switches are employed and the contacts 82 are arranged so that either or both switches can be closed.

The handle 30 includes a top case 104 that mounts to the handle bottom 50 and encases the link outer end 35, extension piece 74, and switches 84. The outer end 35 of the link 34 extends through a slot 105 that is formed in the front and inner sidewall of the handle top case 104.

More particularly, the junction 75 of the extension piece 74 and outer end 35 of the link 34 is the location where the extension piece 74 is bent upwardly (FIG. 2) to an orientation generally perpendicular to the plane of the link 34. Between that junction 75 and the switch piece 80, the extension piece 74 is bent into a curved shape. The switch piece 80 is bent at the extension 74 so that the switches 84 face upwardly, and the underside of the switch piece 80 is fastened to the upper surface 54 of the handle bottom 50.

The slot 105 in the handle case is sized so that the extended handle 30 may pivot about the axis 57 of the pivot post 56 between a position wherein the long central axis 86 of the handle (FIGS. 1 and 2) is angled about 70° (see angle 87, FIG. 1) from the long central axis 88 of the link 34 to a position where angle 87 is about 120°. This pivotable, extended handle 30 permits a user facing the computer display screen 46 to grasp the handle 30 with the wrist in a comfortable position throughout the full range of motion of the handle 30.

Rearward (i.e., toward the lower right side of FIG. 2) of the switch piece 80 there is mounted to the handle bottom 50 a fulcrum block 92 to which is attached a switch lever mechanism 94. The switch lever mechanism 94 comprises a generally flat rectangular plate having an elongated slot 96 formed in it to extend from the forward end of the plate to a location near the rearward end 102 of the mechanism 94, thereby providing two cantilevered lever arms 98, 100 that are joined at the rearward end 102. The rearward end 102 is fastened to the fulcrum block 92.

The upper surface 106 of the handle case 104 is recessed near the forward end of the case. A slit 103 is formed in the vertical shoulder that extends between the recessed surface 108 and the top surface 106 of the handle case 104. The free ends of the lever arms 98, 100 extend through the slit 103. The lever arms 98, 100 of the switch lever mechanism rest upon the tops of the snap-dome switches 84, which switches are normally in the open position. The free ends of the lever arms 98, 100 are suspended a short distance above the recessed surface 108 in the handle case 104 and are equipped with finger grips 110. The snap-dome switches 84 are closed when the user presses a finger grip 110, hence bending the corresponding lever arm 98, 100 about the fulcrum block 92 to depress the underlying switches 84. The recessed surface 108 acts as a stop to limit downward motion of the lever arms 98, 100.

As noted above, the extended handle 30 may be retracted and stowed within the computer housing 36. With reference to FIGS. 7–10, the stowage compartment 38 formed in the base 44 of the computer housing 36 is shaped to generally conform to the exterior shape of the handle 30. The stowage compartment 38 is defined by an inner wall 116 (FIG. 7) that is recessed and generally parallel to the outer wall 118 of the computer housing base 44. A front wall 120, rear wall 122, and top wall 124 define the remaining portion of the stowage compartment 38. The interior of the compartment, therefore, is contiguous with a handle-receiving opening 126 formed in the outer wall 118 of the housing.

The underside of the stowage compartment 38 is generally open, except for a front guide rib 128 that protrudes rearwardly from the bottom edge of the front wall 120 of the compartment, and a rear guide rib 130 that protrudes forwardly from the bottom edge of the rear wall 122 of the compartment.

An elongated aperture 134 is formed through the inner wall 116 of the stowage compartment. The link 34 extends through the aperture 134. Preferably, the aperture 134 is slightly larger than the cross section of the link 34, so that the link can slide through the aperture 134 whenever the handle 30 is moved in a direction toward or away from the housing, and so that the link can move slightly forwardly and rearwardly within the slot relative to the compartment when the handle is moved forwardly and rearwardly.

Whenever the handle 30 is inserted into the stowage compartment 38, the front guide rib 128 fits within a correspondingly shaped elongated notch 140 that is formed in the front lower-most edge of the handle 30 (FIG. 10). Similarly, the rear guide rib 130 fits within a correspondingly shaped elongated notch 141 that is formed in the rear lower-most edge of the handle 30. Accordingly, insertion of the handle 30 into the compartment 38 is smoothly guided by the guide ribs 128, 130 that are received in the associated notches 140, 141.

A spring-biased latch 142 secures the handle 30 within the stowage compartment 38 whenever the handle is fully inserted therein. In this regard, the latch 142 includes a generally flat leg 144 that is mounted for upward and downward movement within an opening formed in the front wall 120 of the stowage compartment 38 (FIGS. 7–10). The rearward surface 146 of the latch leg 144 is generally coplanar with the surface of the front wall 120. A latch toe 148 protrudes into the stowage compartment from the bottom of the latch leg 144. The top of the latch leg 144 is joined to the underside of the eject button 40.

The eject button 40 is formed to include a stem 152 (FIG. 9) that extends downwardly adjacent to, and forward of, the latch leg 144. The button stem 152 fits within a hollow boss 154 that protrudes upwardly from the bottom 53 of the computer housing base 44. A compression spring 156 is contained within the hollow boss 154 for continuously urging upwardly the stem 152 of the eject button 40, along with the attached leg 144. The button 40 fits within a hole in the top panel 164 of the computer housing. The button 40 is shaped to have a shoulder 160 that normally engages the underside 162 of the top panel 164 (FIG. 8) until the button is pressed by a user.

Whenever the handle 30 is inserted into the stowage compartment 38, the protruding latch toe 148 fits within a slot 107 that is formed in the handle top case 104. As best shown in FIGS. 7 and 10, the latch toe 148 is shaped so that its upper surface 166 is sloped downwardly and outwardly at the portion of the toe 148 that first engages the inserted handle 30. The slot 107 and latch toe 148 are configured and arranged so that as the handle is inserted into the stowage compartment 38, the inclined surface 166 of the toe contacts the upper edge of the slot entrance. Continued insertion of the handle, therefore, develops a downward component of force against the latch toe 148 to compress the spring 156 and lower the latch 142 so that the toe 148 travels through the slot 107 as the handle is inserted.

As the handle 30 moves into the fully stowed position with the compartment 38 (that is, with the outer wall 170 of the handle 30 coplanar with the outer wall 118 of the computer), the latch toe 148 moves beneath a recess 172 that is formed in the handle top case 104 to extend upwardly, contiguous with the outer part of the slot 107. The recess 172 provides clearance for the latch toe 148 so that the compression spring 156 is able to force the latch and eject button 40 upwardly to the normal position (FIG. 8). When the button 40 is in the normal position, the latch toe 148 resides within the recess 172. The handle 30 is, therefore, held within the compartment until the eject button 40 is pressed to move the latch toe 148 downwardly out of the recess 172 and into alignment with the slot 107.

Preferably, the stowed handle 30 is ejected slightly from the stowage compartment 38 whenever the eject button 40 is pressed, As a result, the user can quickly and easily grasp the handle 30 and pull it into a fully extended or operating position. In a preferred embodiment (see FIGS. 2, 10, and 11), the ejection mechanism comprises a torsion spring 180 that has one end fastened to a spring boss 182 that is formed in the handle bottom 50 near the pivot post 56. The spring 180 extends forwardly along the upper surface 54 of the handle bottom. The free end 184 of the spring (FIG. 10) is bent to extend through an elongated opening 186 in the handle bottom so that the end protrudes into the notch 140 that receives the guide rib 128. The opening 186 extends along the outermost portion of the notch 140.

When the handle 30 is outside the stowage compartment, the spring 180 is arranged so that the protruding end 184 is normally biased against the innermost end of the opening 186 (solid lines, FIG. 10). As the handle 30 is inserted into the stowage compartment 38, the outermost end of the front guide rib 128 bears against the spring end 184. Continued movement of the handle 30 into the stowage compartment 38 causes the guide rib 128 to push the spring end 184 outwardly through the opening 186, thereby deflecting or loading the spring (dashed lines, FIG. 10) as the handle is fully inserted and latched.

As the user depresses the eject button 40 so that the latch toe 148 moves out of the handle recess 172, the end 184 of the torsion spring 180 bears against the end of the rib 128 to force the handle part-way out of the stowage compartment 38 where the handle can be easily grasped and further extended by the user.

As noted earlier, the present system determines the position of the handle 30 by sensing the corresponding motion of the link 34 as the link moves relative to sensing components that are contained in the computer housing. The sensing components are next described with particular reference to FIGS. 12–18.

In a preferred embodiment, the sensed portion of the link 34 is constrained to movement within a single plane and in dimensions that correspond to a polar coordinate system. More particularly, the link 34 is constrained to translational movement in a single direction or dimension (hereafter referred to as the R direction shown as arrow R, FIG. 15) relative to a carrier 190 through which the link 34 slides. The carrier 190 is rotationally mounted to the bottom surface of the computer housing base 44 so that the carrier also rotates for defining an angular or Θ direction of link motion, shown as angle Θ, FIG. 15.

The carrier 190 includes a base 192 (FIG. 12) that is generally rectangular in plan view. A recess 194 is formed in the base 192 to extend completely through the length of the base. A hole 196 is formed near the outermost end (that is, to the right in FIG. 12) of the base 192 thereby to receive an upwardly projecting pivot post 198 that is fastened to the bottom of the computer housing base 44. The pivot post 198 snaps into the hole 196 to secure the carrier base 192 thereto while permitting rotation of the base 192 about the central axis of the post, that axis hereafter referred to as the origin axis 200.

The recess 194 in the carrier base 192 is constructed so that the link 34 slides freely lengthwise through the carrier. Preferably, the carrier is formed of low-friction material, such as a thermoplastic filled with polytetrafluoroethylene (PTFE).

With reference to FIGS. 12 and 13, the spring contacts 78 mentioned above each comprise an elongated strip of gold-plated spring material, such as a beryllium copper alloy. Alternatively, the spring material could carry a silver/graphite brush on the free or contact ends 79. The spring contacts 78 are heat-staked at 81 to the carrier base 192 away from the contact ends 79. The spring contacts are bent away from the base 192 by a distance sufficient to provide a low contact force (for example, less than 10 dynes) against the undersurface of link 34 (in particular, against the conductive strips 62) to ensure effective contact without excessive wear. Preferably, the spring contacts 78 are split lengthwise between the ends 79 and the heat-staked portions 81 to effectively double the number of contacts, thereby to enhance reliability of the contacts.

The contacts 78 are formed to bend approximately 90° near the heat-staked portions 81 so that ends 83 of the contacts 78 protrude through a side opening 85 in the carrier base 192. The ends 83 are connected to a top board 202 component of the carrier for conveying switch information for processing by the sensing system described below.

Figure 17:
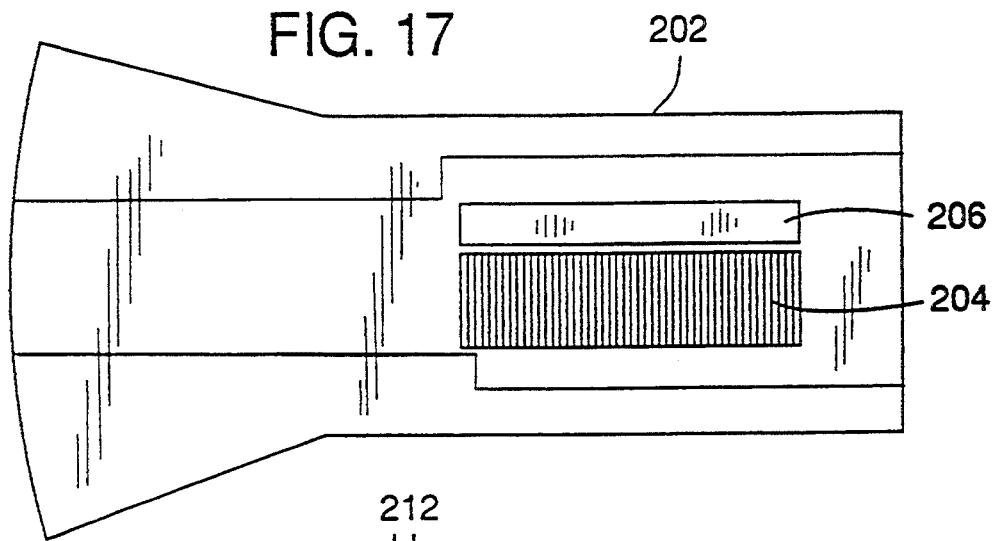
FIG. 17 is a view taken along line 17—17 of FIG. 12 showing the underside of a sensing component.
Figure 18:
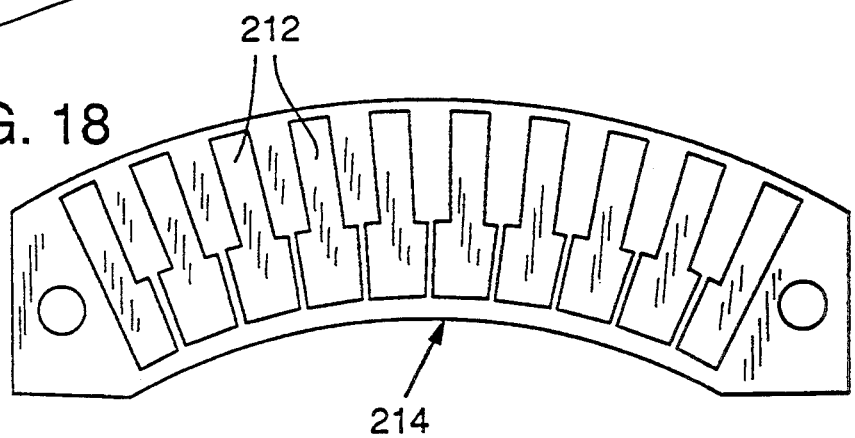
FIG. 18 is a view taken along line 18—18 of FIG. 16 showing the underside of another sensing component.

The top board 202 is a thin, flat member that is fastened to the carrier base 192 so that the top board extends across and covers the recess 194 in which the link 34 slides. The top board 202 comprises a 0.35 mm thick polyimide sheet carrying conductive material to define a flexible flat circuit. In this regard, the top board 202 includes on its underside (see. FIG. 17) two patterns of conductive material, such as copper foil. One pattern, hereafter referred to as the R driven array 204, comprises a plurality of closely spaced rectangular elements to each of which is applied a moving wave signal that is used as part of a low-power sensing technique described below. The other pattern on the underside of the top board 202 comprises a single elongated rectangular electrode, designated the R pickoff electrode 206. The R driven array 204 and the R pickoff electrode 206 combine with the R mixer pattern 58 formed on the link 34 to produce signals representative of the translational movement of the link in the R direction, as described more fully below.

The inner-most end of the top board 202 extends inwardly beyond the inner-most end of the carrier base 192. The width of that end of the top board (as viewed in FIG. 17) gradually increases in the inner direction and includes upon its upper surface two patterns of conductive material, such as copper (see FIG. 12). One pattern comprises a plurality of closely spaced rectangular elements, hereafter referred to as the Θ driven array 208. The other conductive pattern is an elongated electrode hereafter referred to as the Θ pickoff electrode 210. Preferably, the Θ driven array 208 and the Θ pickoff electrode 210 are arranged in concentric arcs, the center of the arcs being the origin axis 200.

The Θ driven array 208 and the Θ pickoff electrode 210 combine with another pattern of closely spaced conductive bars, hereafter referred to as the Θ mixer pattern 212 (FIG. 18) that is carried on the underside of a generally arcuate-shaped flat Θ board 214 that is mounted to extend across the upper surface of the top board 202 in close proximity with the top board. The Θ board 214 comprises a 0.038 mm thick layer of patterned copper sandwiched between two layers of a 0.05 thick polyimide sheet with an adhesive, such as epoxy or acrylic, the total thickness of the Θ board 214 being about 0.15 mm. The Θ board 214 has a hole at each end through which fits a mounting post 216 that projects upwardly from the bottom of the housing base 44 on opposite sides of the carrier top board 202.

The top board 202 is retained adjacent to the Θ board 214 by a rigid keeper plate 217 that spans across the top of the Θ board 214 and is fastened at four corners to the upper surface of the top board 202.

The relative motion of the link 34, top board 20, and the Θ board 214 produces changes in signals that are generated and processed as described below. The processed signals are indicative of the handle position and switch status, and are provided to the computer via a ribbon-type conductor 70 that emanates from the top board and terminates in a conventional connector 71.

The assembled carrier 190 is rotatable about the origin axis 200 through a maximum angle Θ, as shown in FIG. 15, of about 20°. Rubber-covered posts 215 fastened to the computer base act as stops to limit the rotation of the carrier 190.

A link retainer mechanism 218 is mounted to the carrier 190 for guiding movement of the link 34 within the carrier and for providing the user with a touch-sensed indication of the limits of the extended or operating position of the handle. Moreover, the link retainer mechanism 218 permits the link to be completely removed from the carrier to facilitate cleaning or replacement of the link and handle.

More particularly, the link retainer mechanism 218 includes an elongated retainer 219 formed, for example, of injection-molded rigid plastic (FIG. 13, 14, 14A). The retainer 219 includes at its center a downwardly protruding cylindrical boss 221 that fits within a slot 223 formed near the center of the base 192. An inner head 225 is formed at the inner (left, FIG. 13) end of the retainer 219 to protrude in the direction toward the nearest edge 227 of the link 34 as best seen in FIG. 13. Similarly, an outer head 226 is formed at the outer end of the retainer 219 to protrude in the direction of the near link edge 227.

Beneath each head 225, 226 is formed a downwardly protruding stop nib 229 (FIGS. 14, 14A) that normally abuts a control surface 231 that is defined by a recess 233 in the carrier base 192 underlying each head 225, 226. The stop nibs 229 protrude into the recess to abut the surfaces 231 so that the retainer heads will normally reside immediately adjacent to the edge 227 of the link 34.

The retainer 219 is normally urged by an elongated spring 235 toward the link so that the stop nibs 227 engage the control surfaces 231 along and elongated rod-shaped spring 235. The spring 235 fits between the retainer 219 and a fulcrum 237 that protrudes from the vertical wall of the carrier base recess 194. The fulcrum 237 is sized so that the spring 235 is deflected, with the ends of the spring 235 held in notches 239 formed in the portions of the retainer heads 225, 226 that face the spring 235. Preferably, the fulcrum 237 is located near the outer end of the carrier base 192 so that the force of the spring 235 against the outer head 226 is greater than the force of the spring against the inner head 225 for the reasons described below.

A generally trapezoid-shaped index nib 241 is formed as part of the link core 64 to protrude outwardly in a direction toward the link retainer 219. When the handle is pulled from the computer into the region to be used, the index nib 241 resides between the inner head 225 and outer head 226 of the link retainer. Accordingly, when the handle is in this use region, the inner-most limit of the handle (that is, the position of the handle nearest the computer) is the location where the index nib 241 of the link 34 contacts the interior, inclined surface 243 (FIG. 13) of the retainer inner head 225, as shown in solid lines in FIG. 13.

When the user moves the handle to store it within the stowage compartment 38, sufficient force must be applied to the link so that the index nib 241 of the link 34 slides along the interior surface 243 and deflects the inner head 225 away from the link to pass completely by the inner head 225. Preferably, the inner surface 243 of the inner head 225 is inclined by an angle, relative to the link axis 88, of about 55° so that the handle may be moved into the stored position with moderate force applied by the user, but with sufficient force to prevent the user from inadvertently leaving the region where the extended handle is maneuvered during use (that is, the region where the index nib 241 resides between the retainer inner head 225 and outer head 226).

When the handle 30 is first ejected from the storage compartment as described above, the index nib 241 resides inside the inner head 225 (that is, to the left of that head 225 in FIG. 13). The user then pulls the handle and link 34 against the inclined external surface 245 of the link retainer head 225, which causes the inner head 225 to deflect from the link 34 and permit the index nib 241 to move into the position between the inner and outer heads 225, 226. Preferably, the inclination of the external surface 245 is about 30° relative to the axis 88 of the link, thereby to provide a low but detectable force of the inner head 225 against the index nib 241 so that the user is able to feel when the index nib moves into the region between the inner and outer heads.

As will become clear upon reading this description, the link 34 and carrier 191 are constructed so that the link may be completely removed from the carrier to permit servicing or replacement of the link or handle. To remove the link, the user pulls the handle outwardly until the index nib 241 engages the inclined internal surface 247 of the outer head 226 of the retainer 219. When sufficient force is applied, the index nib will slide along the internal surface 247 thereby causing the outer head 226 to deflect from the link so that the link can be completely removed from the carrier and, therefore, from the computer. Preferably, the internal surface 247 of the outer head 226 is inclined to define and angle relative to the link axis 88 of about 75°. This steep inclination of the internal surface 247 requires a relatively strong force to remove the link, thereby tending to prohibit inadvertent removal of the link during use of the handle. It will be appreciated that because of the location of the fulcrum 237 being relatively nearer the outer head 226 than the inner head 225, the force applied by the spring 235 is also relatively greater than the spring force applied to the inner head 226. This fulcrum position, therefore, further increases the resistance to deflection of the outer head 226 to avoid inadvertent removal of the link.

The external surface 249 of the outer head 226 of the link retainer defines an angle relative to the link axis 88 of about 30°, thereby to permit reinstallation of the link with approximately the same force needed for moving the handle out of the extended position (that is, deflecting inner head 225) and toward the stored position.

It is noteworthy here that numerous changes may be made to the construction of the preferred embodiment of the invention. For example, the carrier and associated components just described may be mounted within the computer in a manner such that the carrier is inverted from the orientation described above and pivotally mounted to the underside of the main circuit board of the computer. Further, numerous variations in the fabrication of the link, including the conductive elements, could be substituted for those described above, as could different mechanisms for conveying switch status information. Moreover, although the foregoing description of the carrier and associated components concerned link motion constrained to a polar coordinate system, a similar carrier mechanism for directing link motion in another coordinate system, such as a Cartesian system, would adequately serve the sensing system of the present invention.

Electrical Sensing System

Figure 19:
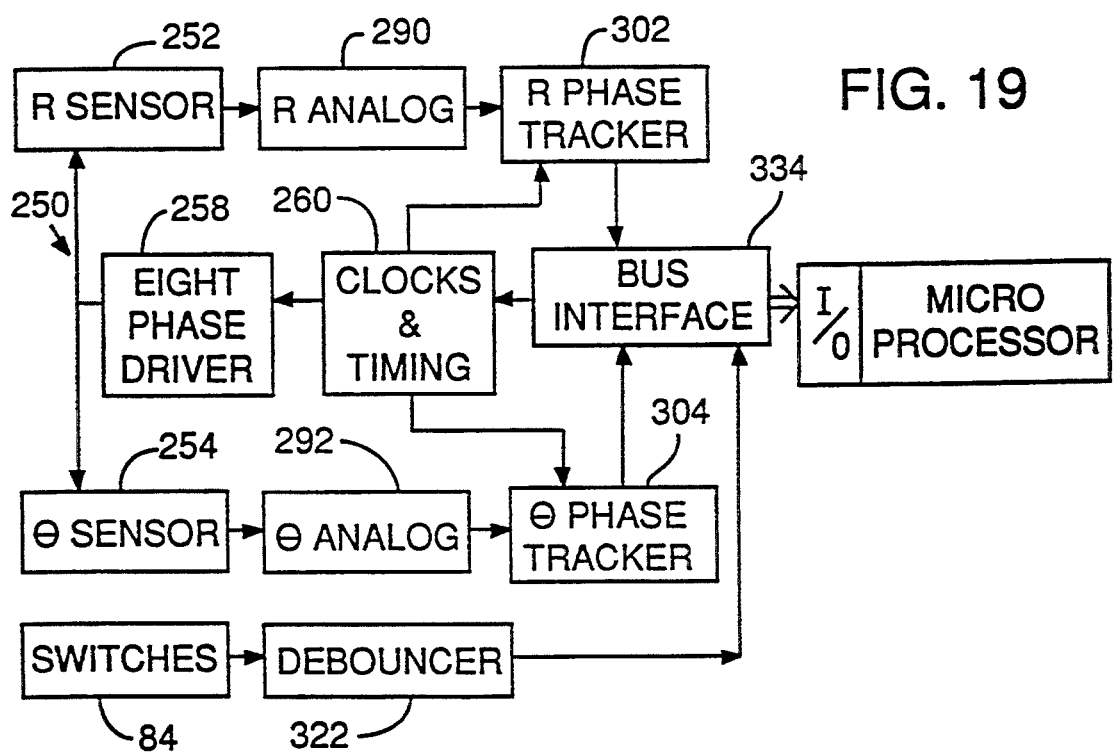
FIG. 19 is a block diagram of the sensing system of the present invention.

With reference to FIG. 19, the present invention includes an electrical sensing system 250 for determining the position of the handle 30 by sensing the displacement of the R and Θ mixer patterns 58, 212 relative to the top board 202 of the carrier 190. The sensing system 250 also senses activation of the handle switches 84, and interfaces with the microprocessor in the computer 32. The sensing of the R and Θ mixer pattern displacement is accomplished by R and Θ sensors 252, 254 in the electrical system. Information developed by these sources is provided to the microprocessor through a bus interface.

R and Θ Sensors. The R and Θ sensors 252 and 254 are electrically identical. Their ability to sense particular handle motions is dependent upon their placement and alignment within the mechanical system associated with the handle. Each of the R and Θ sensors comprise a driven array, a pickoff electrode and a mixer pattern. The R driven array 204 and the Θ driven array 208 are located on opposite sides of the top board 202 as described above and shown in FIGS. 17 and 12, respectively.

The R and Θ driven arrays also differ in shape. The R driven array 204 is generally straight to allow sensing of link motion in a linear or R dimension along a radius from the origin axis 200. The Θ driven array 208, however, is shaped in an arc to allow sensing of the angular or Θ motion of the link 34 about the origin axis 200. In the assembled carrier, the R and Θ pickoff electrodes 206 and 210 are adjacent, respectively, to the R and Θ driven arrays 204 and 208. The R and Θ mixer patterns are somewhat similar in shape to their respective driven arrays. The R mixer pattern 58 is located on the top surface of the link 34. The Θ mixer pattern 212 is located on the bottom surface of the arcuate Θ board 214.

Referring again to FIG. 19, the R and Θ driven arrays are driven with a moving wave signal generated by an eight phase driver 258. The eight phase driver is driven with a 204.8 kHz timing reference signal from a timing controller 260. In response to the timing reference signal, the eight phase driver generates eight waveform signals. Each of the waveform signals is a 400 Hz waveform modulated onto a 25.6 kHz single side band carrier. However, the 400 Hz waveform modulated on each waveform signal differs in phase from 400 Hz waveform of the other waveform signals. Specifically, in comparison to the timing reference signal, the 400 Hz waveforms of the eight waveform signals have phases of 0°, 45°, 90°, 135°, 180°, 225°, 270°, and 315°. The eight phase driver generates the waveform signals by digitally simulating a signal with the proper carrier frequency and modulation.

The R driven array 204 comprises an eight bar pattern replicated seven times. The Θ driven array 208 comprises an eight bar pattern replicated five times. The pitch of the bars is 640 μm. A portion of the 56 bar R driven array 204 thus formed and the adjacent portion of the R pickoff electrode 206 is shown enlarged in FIG. 20. Also shown in FIG. 20, in dashed lines, are elements of the R mixer pattern 58, which is held in the carrier 190 parallel to and spaced within 0.13 mm of the R driven array 204.

Driven array bars 264 through 271 in the R driven array 204 form one of the replicated eight-bar patterns. Each of the driven array bars is driven with one of the eight waveform signals generated by the eight phase driver 258. Each successive bar is driven with a waveform signal whose 400 Hz waveform has a phase which is 45° advanced from the waveform phase of the signal driving the previous bar. Thus, relative to the waveform signal of 0° phase driving the first bar 264, the signal driving the second bar 265 has a phase of 45°; the signal driving the third bar 266 has a phase of 90°; and so on. Eight bars together complete an entire cycle.

The R mixer pattern 58 also comprises an array of bars. The R mixer pattern bars, however, are shaped differently. Each mixer pattern bar has a mixer portion with a width equal to 2560 μm and a wider base portion. Mixer bar 274, for example, has a mixer portion 276 and a base portion 278. The pitch of the mixer pattern bars is 5120 μm. Thus, four driven array bars fall within the width of each mixer portion as the mixer pattern overlays the driven array in the assembled carrier. Also, the pitch of the mixer bars encompasses eight driven array bars.

The dimensions of the Θ driven array 208 and Θ mixer pattern 212 are similar to those of the R driven array 204 and R mixer pattern 58 although their arrangement is in the shape of an arc rather than linear. The dimensions given for the driven arrays and mixer patterns are those of a preferred embodiment of the invention and may be suitably varied in alternate implementations.

The driven array and mixer pattern of each sensor are overlaid, but spaced apart, when the position encoder system is fully assembled (FIG. 16). In this arrangement, the mixer portion of each mixer bar covers four driven array bars. Each mixer portion is thus capacitively coupled to the four driven array bars. The wider base portions of the mixer bars cover and capacitively couple to the pickoff electrode adjacent to the respective driven array on the top board 202.

The mixer patterns slide from side-to-side adjacent to their respective driven array when handle 30 is moved by the user. For example, as the handle and link is moved in the R direction (parallel to the link axis 88) the mixer portions 276 of the R mixer pattern 58 move adjacent to the R driven array 204. Moving the handle 30 to rotate the link (and carrier 190) about the origin axis 200 in turn moves the mixer portions of the Θ mixer pattern 212 adjacent to the Θ driven array 208.

Figure 20:
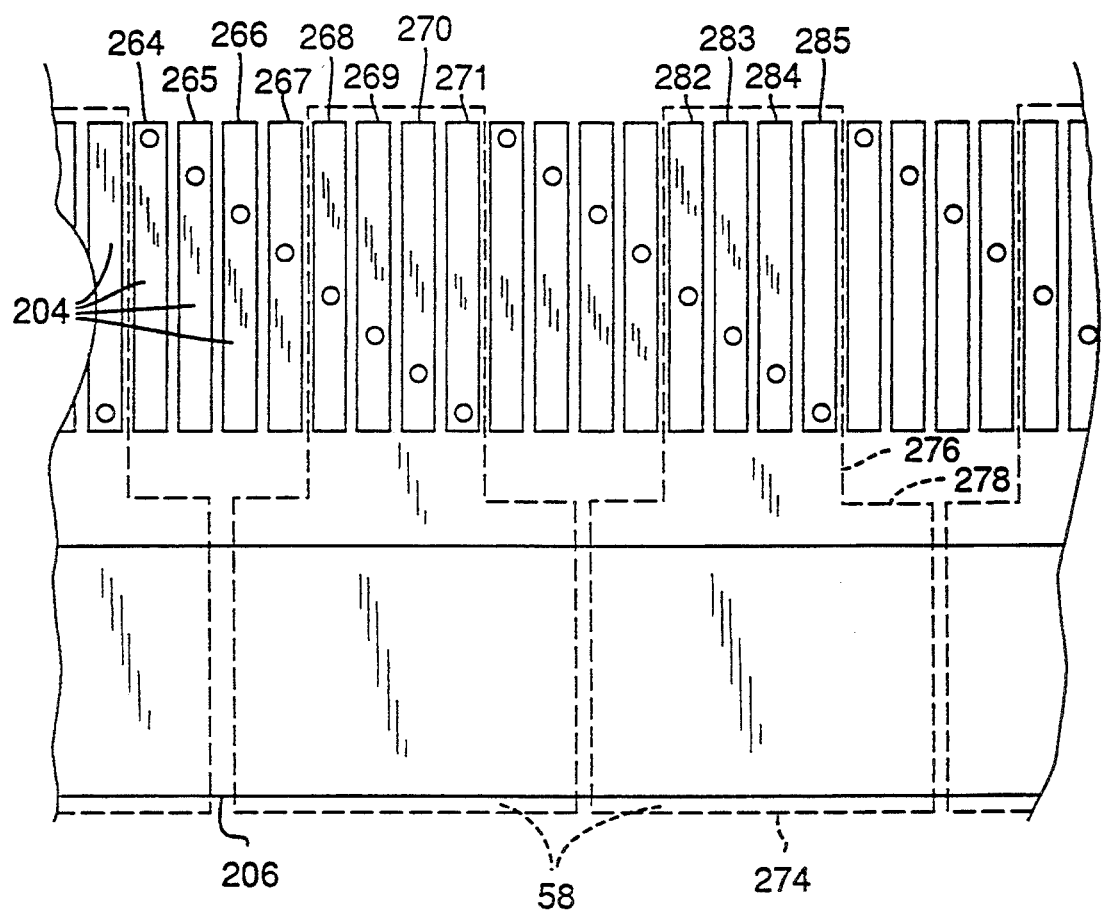
FIG. 20 is an enlarged detail view of a portion of the sensing system.

Being capacitively coupled to four driven array bars, the mixer portion receives and mixes the waveform signals driving the adjacent four bars of the driven array. The mixer portion produces, as a result of mixing the waveform signals, a combined R sensor signal having a phase relative to the position of the center of the mixer bar on the driven array. For example, as shown in FIG. 20, the center of the mixer bar 274 is between the two driven array bars 283 and 284. The mixer bar 274 receives the waveform signals driving the four driven array bars 282, 283, 284 and 285. These signals will have phases of 180°, 225°, 270° and 315° relative to the phase of the waveform signal driving a first driven array bar 264. The R sensor signal produced by the mixer bar from these signals when the mixer bar is exactly between the driven array bars 283 and 284 has a phase equal to 247.5°. However, when the handle 30 is moved toward or away from the origin axis 200, the center of the mixer bar 274 will be displaced along the R driven array 204 and the phase of the R sensor signal will vary accordingly. In essence, the R sensor signal is phase modulated by the displacement of the R mixer pattern 58 over the R driven array 204.

Since the mixer portions of the mixer bars are each separated by an entire cycle, the R sensor signals produced by the mixer bars each have the same phase. These R sensor signals are received by the R pickoff electrode 206 on the top board 202 through the capacitive coupling of the mixer bar base portions (such as portion 278) to the R pickoff electrode 206. The replication of one full cycle or eight driven array bars a total of seven times in the driven array serves to increase the strength of the R sensor signal received by the pickoff electrode 206. The Θ mixer pattern 212 and Θ pickoff electrode 210 operate similarly to produce a Θ sensor signal.

R and Θ Analog Circuit Blocks. Referring again to FIG. 19, the R and Θ sensor signals have been capacitively coupled through the driven array and pickoff electrode combination. The capacitance of each sensor is approximately 5 pF. Therefore, the signals are low-level analog signals, and probably badly corrupted by noise. In order to pass 400 Hz sine waves through the R and Θ sensors effectively, the eight phase driver 258 generates each of eight waveform signals as a 400 Hz sine wave modulated on a 25.6 kHz carrier. The capacitive R and Θ sensors would otherwise present an overly high impedance to the waveform signals. Thus, the signals produced by the R and Θ sensors are 25.6 kHz single side-band suppressed carrier signals modulated by a 400 Hz waveform. This 400 Hz waveform is phase-modulated as described above by the sensed position.

Figure 21:
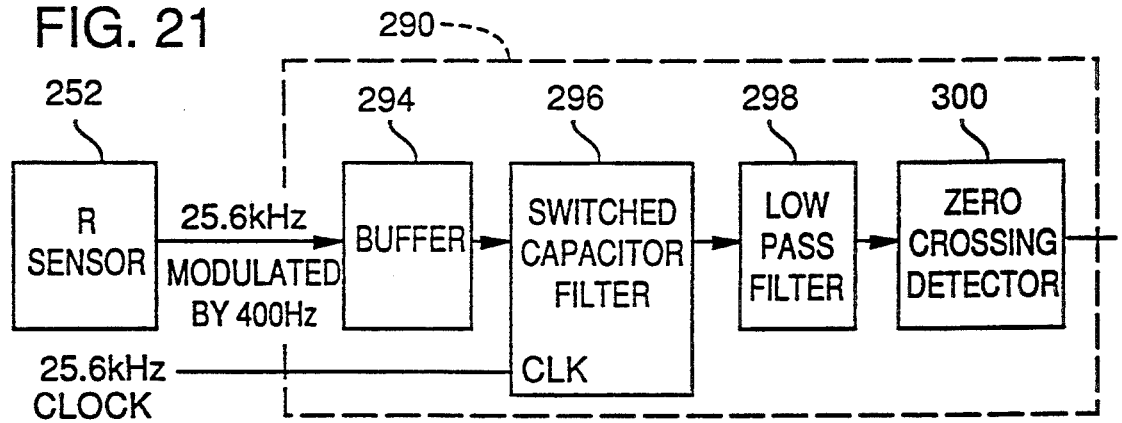
FIG. 21 is a block diagram of an analog circuit portion of the sensing system.

The signals from the R and Θ sensors are amplified, demodulated and filtered by identical R and Θ analog circuits 290 and 292 to recover 400 Hz phase-modulated signals. Referring to FIG. 21, in the R analog circuit 290, the 25.6 kHz signal from the R sensor 252 is received by a buffer 294. The buffer matches the high impedance of the R sensor to the lower impedance of a switched capacitor filter 296. In the preferred embodiment, the buffer 294 is implemented as an NPN transistor in emitter follower configuration. The switched capacitor filter 296 functions as both a demodulator and a band pass filter. In the preferred embodiment, a Linear Technologies LTC1060 switched capacitor filter is used. The switched capacitor filter 296 has a non-linear mixing effect due to its discrete time sampling. The filter 296 as clocked by the same 25.6 kHz carrier signal used to modulate the 400 Hz driver signal, thus demodulating the 25.6 kHz single side band signal. The 400 Hz phase-modulated signal is thereby extracted. The filter 296 also serves to band-pass filter the signal to remove signals extraneous to the 400 Hz phase-modulated signal.

A low-pass filter 298 is connected after the switched capacitor filter to remove remnants of the carrier and smooth the discrete time sampling of the switched capacitor filter.

The final component of the R analog circuit 290 is a zero crossing detector 300. The zero crossing detector is implemented with a comparator to detect zero crossings of the 400 Hz phase modulated signal and to generate a trigger signal on detection of a zero crossing. Upon detection of a zero crossing of the 400 Hz signal, the zero crossing detector generates a low to high transition of the trigger signal. A calculation of the position of the handle can be made by determining the time of arrival of the trigger signal. The structure of the Θ analog circuit 292 is identical to that of the R analog circuit 290 shown in FIG. 21.

Figure 22:
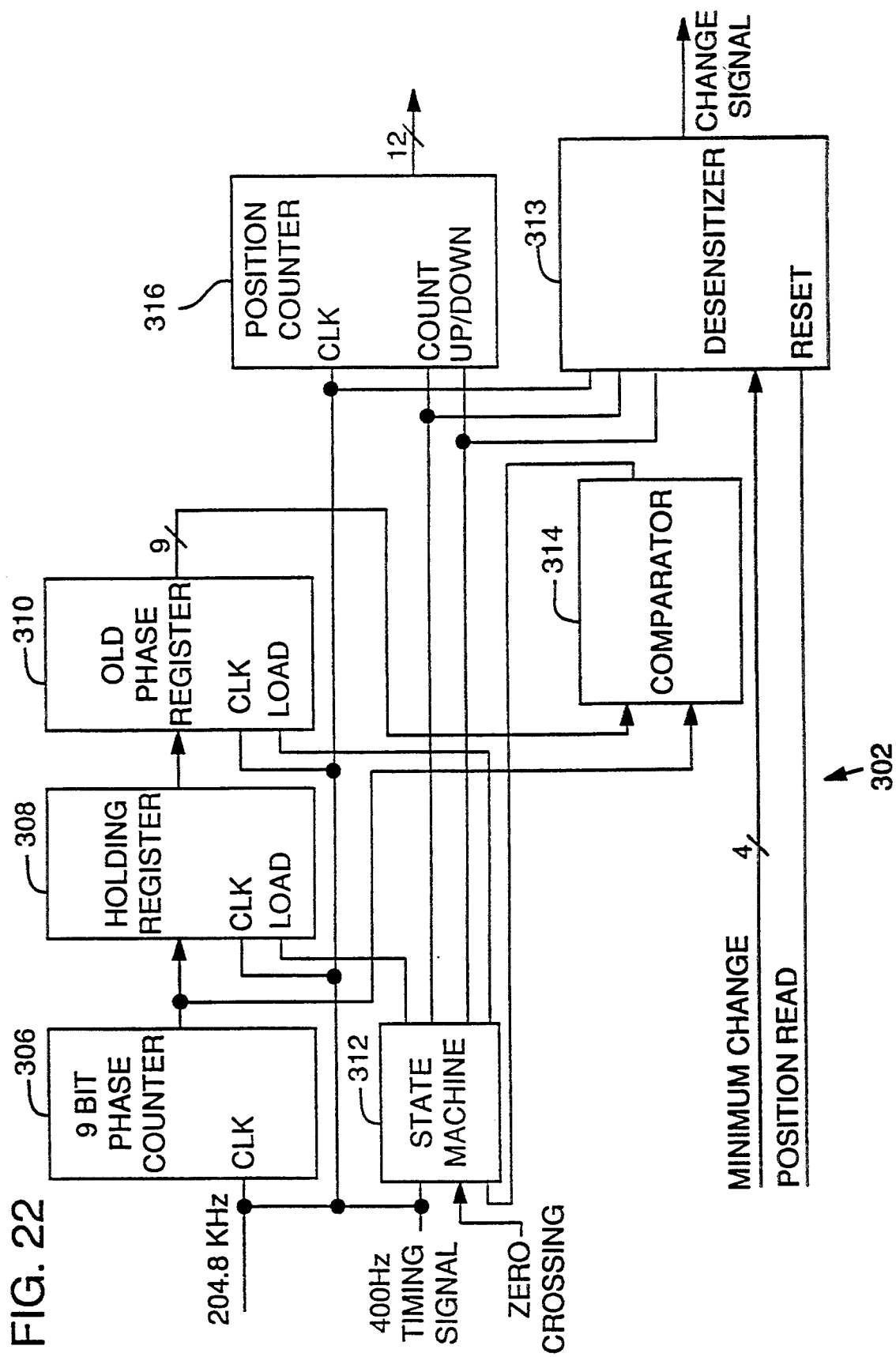
FIG. 22 is a block diagram of a phase tracker circuit portion of the sensing system.

R and Θ Phase Trackers. Referring again to FIG. 19, connected to the R and Θ analog circuits 290 and 292 are R and Θ phase trackers 302 and 304. The phase trackers 302 and 304 detect and track the phase of the respective R and Θ sensor signals. The structure of the R phase tracker 302 is shown in FIG. 22. The Θ phase tracker 304 has an identical structure.

A first part of the R phase tracker performs the function of detecting and storing the phase of the R sensor signal. The phase is detected and stored in the R phase tracker 302 using a 9-bit phase counter 306, a holding register 308, an old phase register 310, and a state machine 312. The phase counter 306 contains a 9 bit digital number or phase count which is incremented in response to a 204.8 kHz clock signal generated by the timing controller 260. This is the same 204.8 kHz clock signal used to drive the 8 phase driver 258. The frequency of the 204.8 kHz clock signal is 512 times the frequency of the 400 Hz waveform signals generated by the 8 phase driver. Therefore, the phase count is incremented 512 counts per cycle of a 0° phase, 400 Hz reference waveform. When the phase count is incremented above a maximum count of 512, the counter 306 overflows and returns to a phase count of zero. Thus, the phase count is relative to the amount of time elapsed during a reference 400 Hz cycle.

The trigger signal generated by the zero-crossing detector in the R analog circuit 290 is received at an input of the state machine 312. On a low to high transition of the trigger signal, the state machine 312 signals the loading of the current phase count into the holding register 308. The count loaded into the holding register reflects a time difference between the start of the 400 Hz reference cycle and the start of the sensor signal's cycle. Consequently, the holding register count is related to the phase difference between the reference waveform and the sensor signal. More specifically, with 512 counts per 360° cycle of the 400 Hz reference waveform, each count is equal to approximately 0.7° of phase difference. Further, with each 360° of phase shift corresponding to a link movement across 8 driven array bars or 5120 μm, each count also corresponds to a link motion of 10 μm.

Before the end of each 0° phase, 400 Hz reference cycle, the state machine 312 sends a load signal to the old phase register. (The exact timing of this load signal is described in more detail below.) This transfers the count in the holding register to the old phase register. Thus, by the beginning of each reference cycle, the old phase register holds an old phase count corresponding to the phase count at the time of the detected zero-crossing in the previous reference cycle.

A second function of the R phase tracker 302 is determining whether the phase of the sensor signal has changed. This is done by comparing the stored sensor signal phase from the previous cycle to the current sensor signal phase. The R phase tracker 302 uses the state machine 312 and a comparator 314 for this purpose.

The comparator 314 detects the time in the current reference cycle that corresponds to the old phase from the previous reference cycle. The comparator 314 compares the phase count from the phase counter 306 to the old phase count. When the current and old phase counts are equal, the comparator 314 signals the state machine 312 with an old phase trigger signal. The state machine is then able to determine that the phase has changed as follows. If the zero crossing trigger signal arrives before the old phase trigger signals then the relative phase of the sensor signal has decreased. If the zero crossing trigger signal occurs after the old phase trigger signal then the relative phase has increased. If the zero crossing and old phase trigger signals occur simultaneously, then there is no change in phase.

A third function of the R phase tracker 302 is to determine the amount of phase change and accumulate this amount in an R position counter 316. The R position counter 316 maintains a 12 bit digital position value corresponding to the position of the handle 30 relative to the origin axis 200. When the state machine 312 detects a change in phase, the R position counter must be updated by the amount of phase change to maintain an accurate position value. Thus, when a zero crossing trigger signal occurs before the old phase trigger signal, the state machine 312 signals the position counter to decrement the position value once for every cycle of the 204.8 kHz clock signal between the zero crossing trigger signal and the old phase trigger signal. (The number of clock cycles that occur between the trigger signals corresponds to the amount of phase change.) Likewise, when the old phase trigger signal occurs first, the state machine signals the position counter to increment the position value by one count for every clock cycle between the old phase and the zero crossing. After both the zero crossing and the old phase trigger signal have been received, the state machine 312 generates the load signal which updates the old phase register 310.

By accumulating the phase changes in the position counter, the phase tracker 302 is able to track cumulative phase shifts of greater than 360°. Since the position counter 316 is a 12-bit counter, 8 complete wavelengths of phase change can be tracked. If the maximum or minimum values of the position counter are exceeded, the position counter will wrap around. The identical $\Theta$ phase tracker 304 also maintains a 12-bit position counter which holds a value corresponding to the angular position of the handle relative to the origin axis 200.

The R phase tracker also includes a desensitizer 313 which prevents the sensing system from responding to insignificant changes in the detected position. The desensitizer 313 compares the amount of phase change against a pre-set minimum change value. As described above, the amount of phase change is the number of 204.8 kHz clock cycles occurring between the trigger signals. The desensitizer determines this number with an internal counter. The minimum change value is set by the microprocessor as described below. If the difference exceeds the minimum change value, the desensitizer 313 generates a CHANGE signal.

Switches. Referring again to FIG. 19, another significant source of user input are the switches 84. The switches, for example, enable the user to select the current cursor position on the screen in order to manipulate on-screen graphics objects. The switches 84 are monostable open. More particularly, the switches 84 remain in an open state until activated by the user. However, they will not remain in the closed state. As soon as user activation ceases, the switches revert to the open state.

The state of the switches 84 is transmitted via three lines through the spring contacts 78 to a debouncer 322 in the sensing system. One of the three lines is a common power line which is held at 5 volts. The remaining two lines are sense lines, one for each of the switches.

When a switch is depressed, its sense line is connected to the common power line, causing the voltage of the sense line to be drawn up to 5 volts. The conductive strips 62 on the underside of the link 34 described above serve as the three lines for transmitting switch state information to the debouncer circuit 322. The debouncer 322 operates to remove spurious state transitions on the sense lines caused by the mechanical operation of the switches. The debouncer 322 generates two single-bit outputs representing the debounced switch states. The debouncer outputs are used to generate interrupts and convey switch state information as described below.

Referring again to FIG. 19, the sensing system 250 includes an interface 334 having four 8-bit read-only registers and two write-only registers for communicating handle position information and switch status information to the computer's microprocessor. Communication with the microprocessor is accomplished through four bytes of the microprocessor's I/O address space usually reserved for bus-type mouse access. The microprocessor is able to access the four 8-bit registers in the interface 334 by correctly addressing these four bytes in its I/O address space. The I/O address, register, and information exchanged are listed in the following Table 1.

| I/O Address | Register Name | Register Function | |
|---|---|---|---|
| 238H read only | R_POS_LSB | Low eight bits of the R position counter | |
| 238H write only | POS_MINCH | Bits 0-3: | Minimum change from last value read to trigger an interrupt. |
| | | Bits 4-7: | Reserved, must be set to zero |
| 239H read only | R_POS_MSB | Bits 0-3: | High four bits of R position counter |
| | | Bits 4-7: | Reads as zero |
| 23AH read only | $\Theta$_POS_LSB | Low eight bits of the $\Theta$ position counter | |
| 23BH | $\Theta$_POS_MSB | Bits 0-3: | High four bits of $\Theta$ position counter |
| | | Bit 4: | Switch interrupts enabled |
| Bits 0-3, 6, 7 | | Bit 5: | Movement interrupts enabled |
| are read only | | Bit 6: | Left switch is depressed |
| | | Bit 7: | Right switch is depressed |

The four read-only registers contain handle position and switch state information. The microprocessor obtains the information from the registers by reading from the indicated addresses in its I/O address space. The data in the read-only registers is updated at the time the microprocessor reads from the R_POS_LSB register. More specifically, when the R_POS_LSB register is read, the four read-only registers store the current 12 bit R and $\Theta$ position values and the two single-bit debouncer outputs. Therefore, when the microprocessor reads position and switch information from the registers, it is necessary to begin reading with the R_POS_LSB register to prevent the registers from changing value before the complete information is read from all the registers.

When the microprocessor writes to the I/O address 238 hexadecimal, bits 0 through 3 are stored in a write-only minimum change register. This four bit value is the minimum change value used by the desensitizer 313 in the R phase tracker 302 and by a desensitizer in the $\Theta$ phase tracker 304. A write-only interrupt enable register stores two bits for masking interrupts when the microprocessor writes to I/O address 23B hexadecimal.

The interface 334 also includes an interrupt generator for informing the microprocessor of a motion of the handle 30 or a change in state of the switches 84. The interrupt generator interrupts the microprocessor by driving IRQ12 on the microprocessor bus. The microprocessor is thereby prompted to read and process the information in the read-only registers. However, the microprocessor is only interrupted if certain conditions are met.

First, an interrupt can only occur if one of two interrupt enable bits are set in the interrupt enable register. A switch interrupt enable bit must be set before an interrupt due to a change in state of the switches 84 occurs. A movement interrupt enable bit must be set before an interrupt due to movement of the handle 30 occurs. The interrupt enable bits may be set or cleared by the microprocessor as described previously to prevent or allow the generation of interrupts by the sensing system.

Interrupts due to movement of the handle 30 also require that one of the desensitizers in the R and $\Theta$ phase trackers 302 and 304 produce a CHANGE signal. The CHANGE signal indicates a change in position greater than the minimum change value held in the minimum change register has occurred. Since interrupts are generated only for a position change greater than the minimum change value, the microprocessor will not be interrupted for uselessly tiny motions of the handle 30. Further, the interrupt generator includes an interrupt decimator which prevents interrupts due to movement of the handle from occurring at a rate greater than 50 Hz.

Interrupts due to a change in state of the switches occur only when the debounced states of the switches change. Thus, if one of the single-bit outputs of the debouncer 322 changes and switch interrupts are not masked, a switch interrupt is generated. Switch interrupts are also limited by an interrupt decimator to a maximum interrupt rate of 25 Hz.

As noted above, the resolution of the phase counters of the R and $\Theta$ phase trackers is approximately 0.7° of phase per count. The pitch of the associated driven array bars is such that each count corresponds to a handle motion of approximately 10 $\mu$m. Accordingly, the motion of the handle may be confined to a very small area and movement within that area directly sensed and mapped to any pixel in the computer display screen. For example, a display having 640 pixels horizontal and 480 pixels vertical would, at a minimum, require an area of only about 7 mm by 5 mm to permit the handle movement to be mapped to (that is, the cursor pointed to) any individual pixel on the screen. In the preferred embodiment, the motion of the handle across about 1" in the R direction and along an arc of about ¾" (when the handle is fully extended) is mapped to the entire display screen. As a result, fine motor skills, such as those used with handwriting, may be employed to move the handle over the small area for directing the cursor to any location on the screen.

Software

Figure 24:
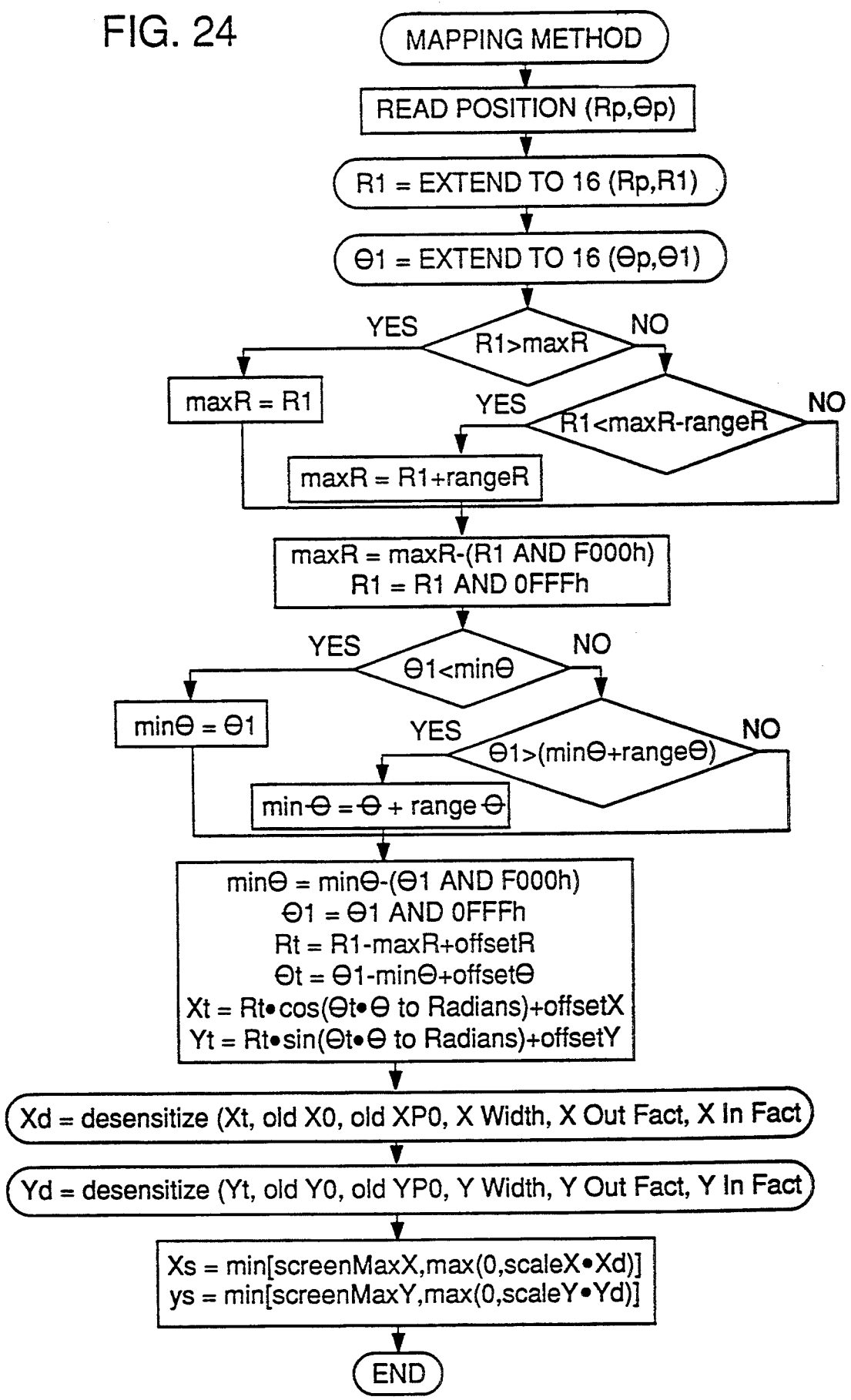
FIG. 24 is a flow chart of a mapping method of the software driver.

The computer microprocessor is programmed with a software driver for transforming changes in the R and $\Theta$ position counters to corresponding cursor movement on the screen. The driver is responsible for responding to interrupts generated by the electrical sensing system to read current position and switch information from the I/O registers. The driver processes this information to map the position information to a pixel on the screen. The processed position and switch information is then made available to an application program or an operating system program which, in response to the information, performs graphics operations such as cursor positioning, icon activation, and others. Operation of the driver is illustrated by the flow charts in FIGS. 23-25.

The preferred embodiment of the software driver assumes a mechanical and electrical sensing system that produces handle movement information in relation to a polar coordinate system. A mapping method of the software driver which maps the polar handle coordinates to cartesian screen coordinates includes a polar to cartesian conversion step. In other embodiments of the invention in which movement of the handle is interpreted by the mechanical and electrical systems in terms of a coordinate system other than polar, the software driver can be modified to perform an appropriate coordinate system conversion in its mapping method.

FIG. 23 is a flow chart illustrating the operations performed by an initialization method of the driver. The initialization method is performed by the driver during system initialization. The purpose of initialization is to set static variables used by the driver in a mapping method of the driver. The mapping method maps position information from the I/O registers to a pixel coordinate (cursor location) on the screen. The true position of the handle 30 will be unknown at initialization simply because the 12 bit R and $\Theta$ positions in the I/O registers do not correspond to a unique position of the handle. Therefore, the static variables are initialized such that the initial R and $\Theta$ positions read from the I/O register will map to a center pixel of the screen. These variables will later be adjusted in an autocalibration method of the driver according to the maximum and minimum R and $\Theta$ positions read.

Initialization proceeds by, first, reading the initial R and $\Theta$ positions from the I/O registers. Then, the static variables are initialized accordingly so that the mapping method of the driver will map the initial R and $\Theta$ positions to the center pixel coordinate of the screen. The following static variables are initialized: maxR, min$\Theta$, R1, $\Theta$1, oldX0, oldY0, oldXP0, and oldYP0.

The variables, maxR and min$\Theta$, are used in the autocalibration method of the driver to track the maximum and minimum R and $\Theta$ positions yet read by the driver. MaxR is set to equal the maximum R value that will map to a pixel on the screen. Min$\Theta$ is likewise set to the minimum $\Theta$ value that will map to a pixel on the screen.

The variables R1 and $\Theta$1 are 16 bit values for storing the current R and $\Theta$ positions. Here, the twelve least significant bits of R1 and $\Theta$1 are simply set equal to the 12 bit initial R and $\Theta$ positions with zeroes set in the four most significant bits.

The variables, oldX0, oldY0, oldXP0, and oldYP0 are static variables used in a desensitizing method of the driver. At initialization, the variables are set to values which insure that the initial position maps to a center pixel coordinate of the screen. This also places the center pixel coordinate in the center of a desensitize window described below.

The variables, oldX0 and oldY0, are the coordinates of the upper left corner of the desensitize window represented in units corresponding to one count of the position value or approximately 10 $\mu$m. OldX0 is set equal to (xRange-xWidth)/2, where xRange is a constant equal to the number of phase counts corresponding to an inch of travel of the handle (i.e., 2560) and where xWidth is a constant equal to the width of the desensitize window. OldY0 is set equal to (yRange-yWidth)/2, where yRange is a constant equal to the number of phase counts per three quarters of an inch of handle movement (i.e., 1920) and yWidth is a constant equal to the height of the desensitize window. Thus, oldX0 and oldY0 define one corner of a desensitize window with a width of xWidth and a height of yWidth within the 1" by ¾" range of handle movement that maps to the screen. While the resolution of the preferred embodiment is chosen to provide mapping of a 1" by ¾" range of handle movement to the screen, different resolutions may also be accommodated by appropriately adjusting the constants, xRange and yRange.

The variables, oldXP0 and oldYP0, are the coordinates of the upper left corner of the desensitize window in desensitized units. OldXP0 and oldYP0 are found by dividing oldX0 and oldY0 by scaling constants, xOutFact and yOutFact.

Mapping Polar Encoder Positions to a Screen Pixel. The driver's mapping method is illustrated by the flow chart in FIG. 24. The mapping method is the heart of the interrupt service routine. The mapping method converts R and Θ positions read from the I/O register (the variables Rp and Θp) to a pixel coordinate on the screen (expressed by the variables Xs and Ys). The R and Θ positions represent the position of the handle in polar coordinates. A pixel on the screen, however, is described by Cartesian coordinates. Therefore, the mapping method must perform a coordinate system conversion while processing the raw R and Θ positions to pixel coordinates.

The first step is to read the 12 bit R and Θ positions (represented in the flow chart by the variables Rp and Θp). The R and Θ positions are read from the I/O registers as described above. It is important to note that the raw R and Θ positions do not correspond to a unique location of the handle 30. The R and Θ position counters hold 12 bit position values and roll over at the 0-4095 boundary. Therefore, any R position is 4096 counts (a distance of 40.96 mm along a radius from the origin axis 200) in either direction from another R position of the same value. Further, the electrical sensing system is unaware of the actual initial location of the handle when power is first applied. The system simply tracks movement of the handle. Thus, the R and Θ positions may be conceived of as polar position coordinates with an unknown arbitrary offset from the actual polar coordinates of the handle. For example, if the handle is fully extended when power is applied, there will be a large positive offset to the R position. Conversely, if the handle is securely stowed in its compartment at power-on, the R position will have a large negative offset. Therefore, the software driver must determine these arbitrary offsets empirically.

The 12 bit R and Θ positions (Rp, Θp) are next extended to 16 bit R and Θ values (R1, Θ1). This extension operation is not a simple sign extension. The actual number of times the R and Θ counters roll over or under are tracked. This ensures that a roll over condition will not cause any problems later in the algorithm. Roll over/under of the 12 bit R and Θ positions (Rp, Θp) is accumulated in the upper 4 bits of the 16 bit R and Θ values (R1, Θ1). The extension operation works by determining how much and which direction the 12 bit R or Θ position has changed since the last update. The extension operation assumes that the R and Θ positions may never change more than 7 FF hexadecimal between interrupts. If an R or Θ position has changed by more than 7 FFh, it is assumed to have actually rolled over in the opposite direction. If a roll over or under has occurred, the four upper bits of the R or Θ value are adjusted accordingly. The lower 12 bits are simply set to equal the respective 12 bit R or Θ position.

The decision tree structure (beginning with "R1>max R") is an R autocalibration method. The R autocalibration method adjusts a range of R values that map to pixels on the screen. It is necessary to adjust the range of values that map to the screen because the R position (Rp) read from the sensing system does not correspond to an actual position of the handle. The R position (Rp) produced by the sensing system contains an unknown offset from the actual position. The autocalibration method, therefore, allows the software driver to adjust the range of handle movement that will map to the screen so that the user may select an appropriate area of movement for the handle.

The autocalibration method operates by monitoring the minimum and maximum R values (R1) yet produced. This is done by keeping track of a maximum R value (maxR) and assuming that it is the right-most edge of the movement area. The R value (R1) is compared to the maximum R value (maxR) and to a minimum R value (maxR—rangeR). If the R value (R1) is greater than the maximum R value (maxR) or less than the minimum (maxR—rangeR), then the maximum R value is adjusted accordingly so that the R value is again within the range between the maximum and minimum R values.

In effect, the R autocalibration method allows the user to adjust the range of movement that maps to the screen by moving the handle out of that range. To move the range to the right, for example, the user simply moves the handle out of the range to the right. The range will automatically be adjusted to the right to keep the handle position within the range. Therefore, if a portion of the range is obstructed, the range may be relocated in the opposite direction. For example, if movement of the handle to the right end of the range is obstructed, the range may be relocated to the left by moving the handle beyond the left end of the range. Thus, if the maximum is wrong in either direction it can be corrected by moving the handle to the opposite extreme.

After adjusting the range, the next steps of the R autocalibration (beginning with maxR=maxR−(R1 AND F000h)) mask off the lower 12 bits of the R value (R1) and adjust the maximum R value (maxR) by the same amounts as the R value. This is done to prevent drift in the R position (Rp) from accumulating over time and causing the 16 bit R value (R1) to roll over.

The second decision tree (beginning with "Θ1<minΘ") is a Θ autocalibration method. The Θ autocalibration method is similar to the R autocalibration method. However, the range of Θ values is defined by a minimum Θ value (minΘ). When the Θ value (Θ1) becomes less than the minimum Θ value (minΘ) or exceeds a maximum Θ value (minΘ+range), the minimum Θ value is adjusted accordingly. The user is thereby allowed to adjust the handle movement range in the Θ dimension that maps to the screen in a manner similar to the R autocalibration. As is done in the R autocalibration, the Θ autocalibration includes the steps (minΘ=minΘ−(Θ1 AND F000h), Θ1=Θ1 AND 0FFFh) to prevent drift in the Θ position (Θp) from accumulating over time and causing the 16 bit Θ value (Θ1) to roll over.

After the R and Θ autocalibration methods, absolute polar coordinates (Rt,Θt) corresponding to an assumed actual position of the handle are calculated. The R maximum and Θ minimum values (maxR and minΘ) are assumed to correspond to actual handle positions (offsetR and offsetΘ). Thus, this is simple a matter of translating values (R1,Θ1) to values (Rt,Θt) such that if (R1,Θ1)=(maxR,minΘ) then (Rt,Θt)=(offsetR,offsetΘ).

The next step is to transform the absolute polar coordinates (Rt,Θt) into cartesian coordinates (Xt,Yt). A polar to cartesian conversion function performs the transformation. The formula used is a simplification of the well known polar to Cartesian function: (Xt,Yt)=Rt* (cos (Θt*ΘtoRadians), sin (Θt*ΘtoRadians))+(offsetX, offset Y). In the form stated above, the function is too complex and time consuming to perform inside an interrupt routine. Further, the use of floating point math is not reasonable. Therefore, an approximation of the function is used instead. Since et will be limited to a sufficiently narrow range of angles, multiplication or division by a constant will approximate the sine function. More specifically, sin (Θt*ΘtoRadians) can be approximated as Θt*ΘtoRadians. The conversion factor, ΘtoRadians, is the number of counts of the Θ position value per radian of handle rotation and is dependent upon specific characteristics of a particular embodiment of the invention (e.g., the radius of the Θ sensor from the origin axis). In the preferred embodiment, ΘtoRadians is equal to 1/5847. Thus, Yt can be calculated as:

$$Yt=(Rt \times \Theta t)/5847+\text{offsetY} \quad (1)$$

Approximation of the cosine function is more complex. The cosine function is calculated using a table look-up technique with linear interpolation to find values between those stored in the table. Because the angle range of the handle is limited to ±6° and the cosine function is symmetrical about 0°, this table size may be minimized. The angle increment of the table is selected to correspond to 256 counts of the Θt position (about 0.04378 radians) to allow interpolation between table values with bit shifting and masking rather than multiplication and division.

Next, a desensitizing method is performed for each of the Xt and Yt coordinates to compute a desensitized position (Xd,Yd). The desensitizing method is described below.

The last step of the mapping method is to scale the desensitized coordinates (Xd,Yd) into the screen coordinate system. This step is shown as the last step in FIG. 24. The step also clips the resulting screen coordinates to the size of the screen. Clipping is necessary because handle movement outside the area mapped to actual screen pixels is allowed to insure that all screen positions are reachable.

Desensitizing Method. The purpose of the desensitize method is to reduce the cursor's sensitivity to small movements of the handle so that fine positioning of the cursor is easier. The desensitize method causes the ratio of cursor movement to handle movement to be lower inside a rectangular window. When the cursor is moved beyond the edge of the window, the window is pulled along by the cursor and the ratio of cursor movement to handle movement is greater. Ideally, the difference in movement ratios should not be perceptible to the user. FIG. 25 is a flow chart of the desensitize method. The method is executed twice; once with X substituted for A and once with Y substituted for A.

The desensitize method uses the following variables: a current coordinate (At), a lower desensitize window limit in pre-desensitize units (oldA0), a lower desensitize window limit in post-desensitize units (oldAP0), a desensitize window width (AWidth), an outside window movement ratio (AOutFact), and an inside window movement ratio (AInFact) to calculate a desensitized coordinate (Ad).

In the first part of the desensitize method (the steps At<oldA0 and (At−AWidth)>oldA0), the current coordinate is compared to the desensitize window limits to determine if the current coordinate is within the desensitize window. If the current coordinate is outside the desensitize window, the limits of the desensitize window (oldA0 and oldAP0) are reset, effectively dragging the desensitize window by an edge. In the final step (Ad=(At−oldA0)×AInFact+oldAP0), the desensitize coordinate (Ad) is calculated.

The values of the desensitize window width (AWidth) and the inside window movement ratio (AInFact) can be set by the user to adjust the "feel" of the position encoder to his or her preference. The outside window movement ratio (AOutFact) is related by the following formula to AInFact and AWidth:

$$AOutFact=(ARange-AWidth*AInFact)/(ARange-AWidth) \quad (2)$$

where ARange is a constant equal to 2560 for X and 1920 for Y as described above in connection with the initialization method.

The invention claimed is:

1. A position encoder system for a computer that has a housing, comprising:
    a handle;
    a latch for securing the handle to the computer housing;
    extension means for releasing the handle from the housing into an extended position for permitting movement of the extended handle relative to the housing;
    a link member having an outer end connected to the handle to move therewith and an inner end received in the housing so that the inner end moves when the outer end moves with the handle; and
    encoder means for sensing movement of the inner end, thereby to determine movement of the extended handle for providing to the computer information that is indicative of the handle position.

2. The system of claim 1 wherein the encoder means includes:
    a first sensing component;
    a carrier to which the first sensing component and the link member are mounted so that the link member moves relative to the first sensing component; and
    coupling means for transmitting first signals from the first sensing component to the link member and for receiving from the link member a second signal that is produced from the first signals, the second signal being indicative of the position of the link member relative to the first sensing component.

3. The system of claim 2 wherein the first signals are transmitted to the link member by capacitive coupling.

4. The system of claim 3 wherein the second signal is transmitted from the link member to the first sensing component by capacitive coupling.

5. The system of claim 2 wherein the coupling means includes a first array of conductive elements mounted to the first sensing component and a first pattern of conductive elements mounted to the link member, the first signals being transmitted from the first array to the first pattern by capacitive coupling.

6. The system of claim 5 wherein the coupling means also includes an electrode mounted to the first sensing component for receiving the second signal through capacitive coupling with the first pattern of conductive elements.

7. The system of claim 2 wherein the second signal has a phase that is modulated as a result of movement of the link member relative to the first sensing component, the encoder means detecting the phase modulation to determine movement of the extended handle.

8. The system of claim 2 wherein the first signals comprise a plurality of moving wave signals of relatively different phases and wherein at least some of the first signals mix to produce the second signal, the phase of the second signal being related to the relative position of the link member and the first sensing component.

9. The system of claim 2 wherein the encoder means further includes:
 a second sensing component mounted adjacent to the carrier, the carrier being mounted to the housing so that the first sensing component is movable with the link member relative to the second sensing component; and
 the coupling means operable for transmitting third signals from the first sensing component to the second sensing component and for receiving from the second sensing component a fourth signal that is produced from the third signals, the fourth signal being indicative of the movement of the link member relative to the second sensing component.

10. The system of claim 9 wherein the third signals are transmitted to the second sensing component by capacitive coupling.

11. The system of claim 10 wherein the fourth signal is transmitted to the first sensing component by capacitive coupling.

12. The system of claim 9 wherein the coupling means includes a second array of conductive elements mounted to the first sensing component and a second pattern of conductive elements mounted to the second sensing component, the third signal being transmitted from the second array to the second pattern by capacitive coupling.

13. The system of claim 1 wherein the encoder means senses rotational and translational movement of the link member.

14. The system of claim 1 further comprising a switch mounted to the handle and operable for generating a switch status signal that is transmitted through the link.

15. The system of claim 1 wherein the link member comprises an elongated member being resiliently flexible in response to force applied to it in one direction and substantially inflexible in response to force applied to it in a second direction.

16. The system of claim 1 wherein the handle is pivotally connected to the outer end of the link member.

17. The system of claim 2 further comprising a retainer means for releasably retaining the link member adjacent to the carrier.

18. The system of claim 17 wherein the retainer means includes an index member attached to the link member, and a retainer member mounted to the carrier for contacting the index member to limit the motion of the link relative to the carrier.

19. The system of claim 18 wherein the retainer member is mounted for deflection from the link when the index member is moved against the link thereby to overcome the motion limit of the retainer member.

20. A stowable input apparatus for a computer that has a housing, comprising:
 a handle;
 a stowage compartment defined in the housing for receiving the handle;
 stowage means for stowing the handle within the compartment and for extending the handle from the compartment so that the handle is movable relative to the housing; linking member connected to the handle and to the housing so that the linking member moves with the handle relative to the housing, a portion of the linking member being received within the housing for translational movement relative to the housing, the movement of that link member portion corresponding to the movement of the handle.

21. The system of claim 20 wherein the housing includes a keyboard that has an exposed surface and wherein the handle is stowed within the housing completely beneath the keyboard surface.

22. The system of claim 20 wherein the stowage means includes a button mounted to the housing and connected to be depressed for releasing the handle from the compartment.

23. The apparatus of claim 20 wherein the linking member portion is also received in the housing for rotational movement relative to the housing.

24. The system of claim 20 further comprising sensing means for sensing the movement of the link member portion and for generating position signal representative of the position of the handle.

25. The apparatus of claim 24 wherein the sensing system comprises:
 a first driven array of elements mounted near the linking member and arranged in a first dimension;
 a second driven array of elements mounted near the linking member and arranged in a second dimension;
 drive means for driving each of the elements of the first and second array of elements with moving wave signals, the phases of which signals varying between adjacent elements;
 a first mixer mounted to the linking member and comprising at least one bar that is capacitively coupled to a plurality of elements of the first driven array, the first mixer receiving some of the moving wave signals and mixing the received moving wave signals to produce a first mixed phase signal having a phase corresponding to the position of the member in the first dimension;
 a second mixer mounted near the linking member and comprising at least one bar that is capacitively coupled to a plurality of elements of the second driven array, the second mixer receiving some of the moving wave signals and mixing the received moving wave signals to produce a second mixed phase signal having a phase corresponding to the position of the member in the second dimension; and
 processing means for processing the first and second mixed phase signals for mapping the position of the linking member as a corresponding location of a cursor on a display screen of the computer.

26. The system of claim 25 wherein the processing means includes:

first phase detecting means for measuring the phase of the first mixed phase signal thereby to determine the displacement of the bar of the first mixer relative to the first driven array; and second phase detecting means for measuring the phase of the second mixed phase signal thereby to determine the displacement of the bar of the second mixer relative to the second driven array.

27. The system of claim 25 wherein the processing means includes:
a first phase modulation receiver coupled to the first mixer for receiving and detecting zero crossings of the first mixed phase signal;
a first phase tracker coupled to the first phase modulation receiver for comparing the zero crossing of the first mixed phase signal to a reference signal and for generating a first count value corresponding to the phase of the first mixed phase signal;
a second phase modulation receiver coupled to the second mixer for receiving and detecting zero crossings of the second mixed phase signal; and
a second phase tracker coupled to the second phase modulation receiver for comparing the zero crossing of the second mixed phase signal to the reference signal and for generating a second count value corresponding to the phase of the second mixed phase signal.

28. The system of claim 27 wherein the first phase modulation receiver comprises a first pickoff for capacitive coupling to the first mixer and the second phase receiver comprises a second pickoff for capacitive coupling to the second mixer.

29. The system according to claim 25 wherein the first mixer is formed on a first mixer circuit and the second mixer is formed on a second mixer circuit, the first mixer circuit and the second mixer circuit coupled through capacitive coupling to a circuit board that includes the first driven array, the second driven array, the first pickoff, and the second pickoff.

30. The system claim 25 wherein the first dimension corresponds to the X component of a cartesian coordinate system and the second dimension corresponds to the Y component of the cartesian coordinate system.

31. The system of claim 25 wherein the first dimension corresponds to the R component of a polar coordinate system and the second dimension corresponds to the Θ component of the polar coordinate system.

32. The system of claim 25 wherein the elements of the first driven array are arranged along a first axis corresponding to the X-axis of a cartesian coordinate system and the elements of the second driven array are arranged along a second axis corresponding to the Y-axis of the cartesian coordinate system.

33. The system of claim 25 wherein the elements of the second driven array are arranged along an arc corresponding to the Θ component of a polar coordinate system and the elements of the first driven array are arranged along an axis corresponding to the R component of the polar coordinate system.

34. A method of generating information for a computer, the information corresponding to the position of a movable handle member, comprising the steps of:
linking the movable handle and the computer with a linking member that moves with movement of the handle;
sending, by capacitive coupling, sensing signals between the linking member and a sensing component contained within the computer so that the sensing signals are modulated by movement of the linking member; and
processing the modulated sensing signals to produce position information based upon the movement of the linking member.

35. A method of controlling a pointing indicium on a computer display screen, comprising the steps of:
extending from the computer a movable handle member;
linking the handle member and the computer with a linking member that moves with the handle member;
detecting movement of the linking member;
generating position information based upon the movement of the linking member; and
stowing the handle member within the computer when the handle member is not used.

36. The method of claim 35 wherein detecting step includes the step of sending, by capacitive coupling, sensing signals between the linking member and a sensing component contained within the computer so that the sensing signals are modulated by movement of the linking member.

* * * * *